(12) United States Patent
Wong et al.

(10) Patent No.: US 12,465,464 B2
(45) Date of Patent: Nov. 11, 2025

(54) INTRAORAL 3D SCANNING WITH AUTOMATIC CHARTING

(71) Applicant: Dental Imaging Technologies Corporation, Quakertown, PA (US)

(72) Inventors: Victor C. Wong, Pittsford, NY (US); Jean-Marc Inglese, Bussy-Saint-Georges (FR); Edward R. Shellard, Atlanta, GA (US)

(73) Assignee: Dental Imaging Technologies Corporation, Quakertown, PA (US)

( * ) Notice: Subject to any disclaimer, the term of this patent is extended or adjusted under 35 U.S.C. 154(b) by 696 days.

(21) Appl. No.: 17/781,060

(22) PCT Filed: Dec. 3, 2020

(86) PCT No.: PCT/US2020/063093
§ 371 (c)(1),
(2) Date: May 31, 2022

(87) PCT Pub. No.: WO2021/113501
PCT Pub. Date: Jun. 10, 2021

(65) Prior Publication Data
US 2023/0000600 A1    Jan. 5, 2023

Related U.S. Application Data

(60) Provisional application No. 62/943,557, filed on Dec. 4, 2019.

(51) Int. Cl.
*A61C 9/00* (2006.01)
*G06T 7/00* (2017.01)
(Continued)

(52) U.S. Cl.
CPC .......... *A61C 9/0053* (2013.01); *A61C 9/0086* (2013.01); *G06T 7/0012* (2013.01);
(Continued)

(58) Field of Classification Search
CPC ... A61C 9/0053; A61C 9/0086; A61C 9/0046; G06T 7/0012; G06T 11/003;
(Continued)

(56) References Cited

U.S. PATENT DOCUMENTS 4,479,499 A    10/1984  Alfano
4,515,476 A    5/1985   Ingmar
(Continued)

FOREIGN PATENT DOCUMENTS

CN    106999020 A    8/2017
EP    3232898 A1     10/2017
(Continued)

OTHER PUBLICATIONS

Communication pursuant to Article 94(3) EPC issued in EP Patent Application No. 14824689.5, dated Mar. 26, 2018, 5 pages.
(Continued)

*Primary Examiner* — Neil R Mclean
(74) *Attorney, Agent, or Firm* — Alston & Bird LLP

(57) ABSTRACT

A method for intraoral imaging generates one or more output imaging signals from an intraoral probe and acquires multimodal image content from intraoral surface locations according to tissue response from the one or more imaging signals and associates spatial coordinates to the acquired multimodal image content. A surface contour of the patient dentition is generated by stitching the acquired multimodal image content and preserving the association of spatial coordinates with the stitched multimodal image content. Tooth outlines for one or more teeth are generated from the generated surface contour and the generated outlines arranged as a dental chart representing a spatial ordering of the one or more teeth and of supporting gum tissue adjacent to the teeth. The dental chart is populated by analyzing the acquired multimodal image content and associating the
(Continued)

analysis to positions on the dental chart according to the preserved association of spatial coordinates and is displayed.

32 Claims, 30 Drawing Sheets

(51) Int. Cl.
*G06T 11/00* (2006.01)
*G16H 30/40* (2018.01)

(52) U.S. Cl.
CPC ............ *G06T 11/003* (2013.01); *G16H 30/40* (2018.01); *G06T 2207/30036* (2013.01)

(58) Field of Classification Search
CPC ......... G06T 2207/30036; G06T 1/0007; G06T 19/20; G16H 30/40; G16H 30/20; G16H 50/20; G16H 10/60; A61B 5/0088; A61B 2018/20353
USPC ........................................................ 382/128
See application file for complete search history.

(56) References Cited

U.S. PATENT DOCUMENTS

| | | | |
|---|---|---|---|
| 6,231,338 | B1 | 5/2001 | De et al. |
| 6,359,648 | B1 | 3/2002 | Fukasaka |
| 6,731,783 | B2 | 5/2004 | Tsujii |
| 7,596,253 | B2 | 9/2009 | Wong et al. |
| 7,668,355 | B2 | 2/2010 | Wong et al. |
| 7,823,782 | B2 * | 11/2010 | Yatagai ............... G01B 9/02091 235/454 |
| 8,447,378 | B2 * | 5/2013 | Crucs .................. A61C 9/0046 600/407 |
| 2004/0202356 | A1 | 10/2004 | Stookey et al. |
| 2004/0240716 | A1 | 12/2004 | De et al. |
| 2006/0285636 | A1 | 12/2006 | Razzano |
| 2010/0268069 | A1 | 10/2010 | Liang |
| 2011/0109616 | A1 | 5/2011 | Ernst et al. |
| 2011/0287387 | A1 | 11/2011 | Chen et al. |
| 2012/0189182 | A1 * | 7/2012 | Liang ..................... A61C 19/00 382/128 |
| 2014/0161369 | A1 | 6/2014 | Ishihara |
| 2014/0253686 | A1 | 9/2014 | Wong et al. |
| 2016/0125601 | A1 * | 5/2016 | Wu ........................ H04N 23/56 382/128 |
| 2017/0224272 | A1 | 8/2017 | Liu et al. |
| 2017/0319057 | A1 | 11/2017 | Inglese et al. |
| 2018/0028064 | A1 | 2/2018 | Elbaz et al. |
| 2018/0357766 | A1 * | 12/2018 | Van Der Poel ...... A61B 5/4547 |

FOREIGN PATENT DOCUMENTS

| | | |
|---|---|---|
| JP | 2017-537744 A | 12/2017 |
| KR | 10-2017-0097653 A | 8/2017 |
| WO | 2014/000745 A1 | 1/2014 |
| WO | 2015/011173 A1 | 1/2015 |
| WO | 2016/099471 A1 | 6/2016 |
| WO | 2019/005055 A1 | 1/2019 |

OTHER PUBLICATIONS

International Preliminary Report on Patentability received for PCT Patent Application No. PCT/US2014/070719, mailed on Jun. 29, 2017, 9 pages.

International Preliminary Report on Patentability received for PCT Patent Application No. PCT/US2020/063903, mailed on Jun. 16, 2022, 8 pages.

International Search Report and Written Opinion received for PCT Patent Application No. PCT/US2014/070719, mailed on Jul. 16, 2015, 11 pages.

International Search Report and Written Opinion received for PCT Patent Application No. PCT/US2020/063093, mailed on Mar. 4, 2021, 10 pages.

* cited by examiner

INTRAORAL 3D SCANNING WITH AUTOMATIC CHARTING

TECHNICAL FIELD

The disclosure relates generally to intraoral imaging and, more particularly, relates to methods and apparatuses for automatic generation of a tooth chart and related content from intraoral scanning.

BACKGROUND

A dental chart is a widely used tool that supports a dental practitioner in planning and tracking patient treatment. Conventionally, the dental chart is manually annotated by the practitioner and treatment staff and is stored in the patient folder in order to maintain an updated record of patient status, treatment progress, and diagnostic concerns.

With the recent adaptation of various electronic tools for imaging and diagnostic support, there is interest in storing and maintaining dental chart information online to allow ready access for reference and update. Among solutions developed to meet this need is, for example, the SOFT-DENT™ software from Carestream Dental LCC. Electronic solutions of this type have helped to improve the efficiency of record-keeping functions and provide mechanisms for better integration of patient information systems and images. Using automated dental charting with segmentation and automatic tooth identification utilities, the dental practitioner can generate, reference, and maintain a dental chart that relates more closely to a particular patient's set of teeth, rather than to standard models. The displayed dental chart can serve as a convenient index and link to information individually obtained from a number of different types of imaging and measurement systems.

For some practitioners, the requirement to manually enter notes and measurement information relevant to each tooth using a computer keyboard makes such a system unattractive in practice, in spite of the perceived benefits of digital data storage. Thus, there is a need for automatic tooth charting methods and apparatus that can both generate an appropriate dental chart for a particular patient from dental images and populate the generated chart with information obtained from applying automated diagnostics to the tooth image data.

Although some automated tools for generating a dental chart for display and integrating the dental chart with image content have been developed, there appears to be appreciable room for improvement. For example, although electronic dental charting allows indexing to image content from various radiographic, optical, and ultrasound sources, in practice, the integration of this image content is typically not straightforward. The task of spatial registration of data from various sources can be challenging with results that can be unsatisfactory and fall short of the accuracy needed for diagnosis and tracking. As a related complication, data from different sources must be temporally synchronized with other image data in order to provide updated information on patient condition. Because existing solutions mimic the "snapshot" data recording function of manually maintained charts, advantages of stored data and automatic update have not been explored and it can be difficult to follow treatment progress. Still other shortcomings relate to limitations in data representation.

Thus, it can be appreciated that there is a need for improvement in systems, apparatuses, and methods that automate the dental charting process and, in particular, provide solutions that integrate the dental chart with multifunctional and/or multimodal intraoral imaging systems.

SUMMARY

Broadly described, the present invention comprises apparatuses, methods and systems for automating the dental charting process by integrating the dental chart with multifunctional and/or multimodal intraoral imaging systems. According to one example embodiment, there is provided a method for intraoral imaging comprising: (a) generating one or more output imaging signals from an intraoral probe; (b) acquiring multimodal image content from each of a plurality of intraoral surface locations for a patient's dentition according to tissue response from the one or more imaging signals and associating spatial coordinates to the acquired multimodal image content; (c) generating a surface contour of the patient dentition by reconstructing and stitching from a data subset of the acquired multimodal image content, and preserving the association of spatial coordinates of the multimodal image content to the stitched surface contour; (d) generating tooth outlines for one or more teeth from the generated surface contour and arranging the generated outlines as a dental chart representing a spatial ordering of the one or more teeth and of supporting gum tissue adjacent to the teeth; (e) populating the dental chart by analyzing the acquired multimodal image content and indicating analysis results at one or more positions on the dental chart according to the preserved association of spatial coordinates; and (f) displaying, communicating, or storing the populated dental chart.

Advantageously, the present invention acquires multimodal image content, automatically associates and preserves spatial coordinates associated with the image content, and automatically analyzes the multimodal image content to populate or update a patient dental chart with minimal input by a dental technician. By automating the dental charting process, the present invention substantially lessens the time required for a dental technician to create and/or update a patient dental chart. As an additional benefit, the accuracy of a patient dental chart may be improved over manual generation or updating of a patient dental chart. As yet another benefit, substantially more information is integrated into a patient dental chart, thereby providing a dental practitioner with more information on a patient's dentition.

Other desirable advantages and benefits inherently achieved by the disclosed systems, apparatuses, and methods may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the example embodiments of the invention, as illustrated in the accompanying drawings. The elements of the drawings are not necessarily to scale relative to each other.

DETAILED DESCRIPTION OF EXAMPLE EMBODIMENTS

Figure 1:
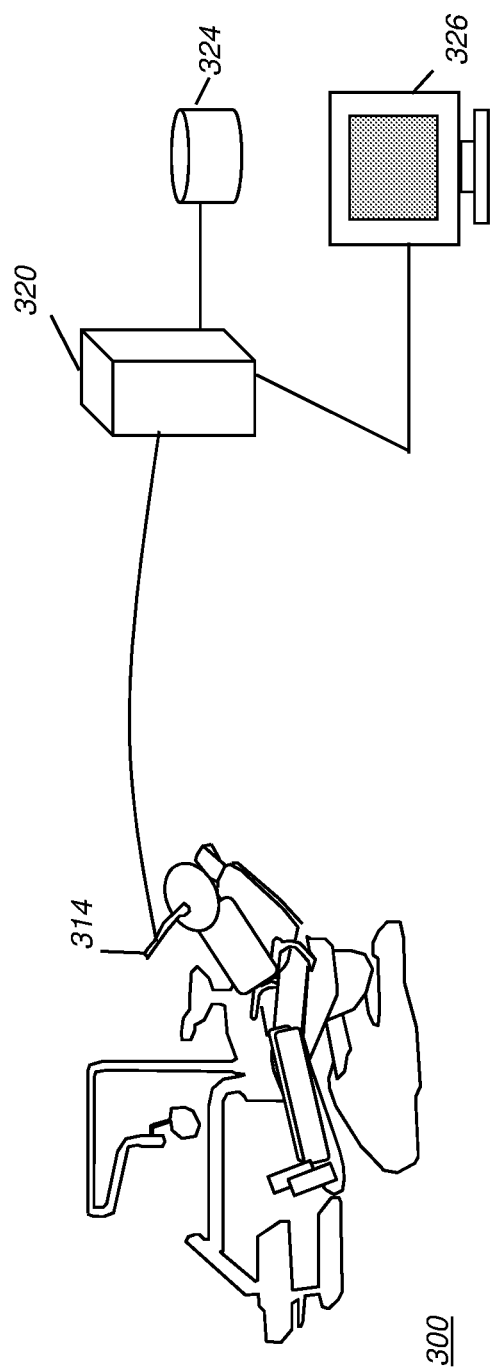
FIG. 1 is a schematic diagram that shows components of an imaging apparatus for multimode image acquisition and automated dental chart generation.

The following is a detailed description of example embodiments with reference being made to the drawings in which the same reference numerals identify the same apparatus elements or method steps in each of the several figures.

Where used in the context of the present disclosure, the terms "first", "second", and so on, do not necessarily denote any ordinal, sequential, or priority relation, but are simply used to more clearly distinguish one step, element, or set of steps or elements from another, unless specified otherwise.

As used herein, the term "energizable" relates to a device or set of components that perform an indicated function upon receiving power and, optionally, upon receiving an enabling signal.

In the context of the present disclosure, the terms "viewer", "operator", and "user" are considered to be equivalent and refer to the viewing practitioner, technician, or other person who views and manipulates an image, such as a dental image, on a display monitor. An "operator instruction" or "viewer instruction" is obtained from explicit commands entered by the viewer, such as by clicking a button on a camera or by using a computer mouse or by touch screen or keyboard entry.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the term "optics" is used, generally, to refer to lenses and other refractive, diffractive, and reflective components or apertures used for shaping and orienting a light beam. An individual component of this type is termed an optic.

In the context of the present disclosure, the term "scattered light" is used, generally, to include light that is reflected and backscattered from an object.

The general term "scanner" relates to an optical system that is used for obtaining various types of intraoral images of patient dentition, including support structures. For OCT (optical coherence tomography) imaging, scanner optics project a scanned light beam of broadband near-IR (BNIR) light that is directed to the tooth surface through a sample arm and is acquired, as scattered light returned in the sample arm, for detecting interference with light from a reference arm used in OCT imaging of a surface. The general term "raster scanner" relates to the combination of hardware components that scan light toward a sample, as described in more detail subsequently.

In the context of the present disclosure, the general term "camera" refers more particularly to a device that is enabled to acquire a reflectance, 2D ("two dimensional") digital image from reflected visible or NIR light, such as structured light that is reflected from the surface of teeth and supporting structures. According to an example embodiment of the present disclosure, a camera that operates at video or near-video rates is used for acquiring images used to generate a 3D ("three dimensional") contour image of the teeth and supporting intraoral surfaces.

The term "subject" refers to the tooth or other portion of a patient that is being imaged and, in optical terms, can be considered equivalent to the "object" of the corresponding imaging system.

In the context of the present disclosure, the phrase "broadband light emitter" refers to a light source that emits a continuous spectrum output over a range of wavelengths at any given point of time. Short-coherence or low-coherence, broadband light sources can include, for example, super luminescent diodes, short-pulse lasers, many types of white-light sources, and supercontinuum light sources. Most short coherence length sources of these types have a coherence length on the order of tens of microns or less.

In the context of the present disclosure, two wavelengths can be considered to be "near" each other when within no more than +/−10 nm apart.

In the context of the present disclosure, the terms "color light", "polychromatic light", and "RGB light" describe visible light illumination that is provided for reflectance imaging. The color image of an intraoral surface location can be considered a reflectance image or color texture image. As is well known in the color imaging arts, a color combiner, such as a dichroic surface that transmits one spectral band and reflects another spectral band, can be used to combine colors for light traveling in one direction along an optical axis and to separate colors for light traveling along an axis in the opposite direction. Thus, the general term "combiner" is typically used for a "combiner/separator" device that both combines and separates light according to wavelength and direction along an optical path.

The term "highlighting" for a displayed feature has its conventional meaning as is understood to those skilled in the information and image display arts. In general, highlighting uses some form of localized display enhancement to attract the visual attention of the viewer. Highlighting a portion of an image, such as an individual organ, bone, or structure, or a path from one chamber to the next, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set "S", a subset may comprise the complete set "S". A "proper subset" of set "S", however, is strictly contained in set "S" and excludes at least one member of set "S".

An example embodiment of the present disclosure obtains multimodal image content from a single intraoral scan. According to an example embodiment of the present disclosure, the multimodal image content that can be obtained from each scanned location on the intraoral surface can include image content of two or more imaging modes, wherein the imaging modes can obtain color/polychromatic or monochrome reflectance image content, fluorescence image content, and depth-resolved image content, for example. Still other image modes can use signal content from different types of sources, including x-ray or ultrasound image content. Image modes can be distinguished from each other in terms of the signal that is provided and the signal that is acquired for obtaining the image.

Image stitching algorithms that form a more complete, composite image by properly aligning and joining together content from a number of 2D images captured from adjacent views provide a data subset of the full set of acquired image content and wherein members of this data subset share adjacent features, are well known to those skilled in the image processing arts.

FIG. 1 is a schematic diagram that shows components of an intraoral imaging apparatus 300 for multimode image acquisition and automated dental chart generation. An intraoral scanner 314 can be energized to acquire multimode image content, generating the different types of light signals and other signals needed to obtain image content from intraoral surfaces. Light signals may, for example, include polychromatic visible illumination, excitation illumination for fluorescence, or a scan sequence of coherent light beams. Other example signal types can include ultrasound and opto-acoustic signals. Operating under multiple imaging modes, a single scanner 314 in the FIG. 1 apparatus can provide multiple functions such as 3D surface contour imaging and depth-resolved imaging. The scanner 314 is in signal communication with a processor 320, such as a computer. Signal communication can be wired, wireless, or may use some combination of wired and wireless transfer. Processor 320 is in signal communication with a memory 324 or with data storage that provides longer term data retention and archival. A display 326, also in signal communication with processor 320, provides the display of the generated dental chart and associated operator interface.

Images obtained from surface contour imaging form a data subset of the acquired multimodal image content obtained from scanner 314. Processing of this data subset through surface contour reconstruction and stitching provides the spatial reference for mapping the data content that is acquired in any imaging mode.

Depth-Resolved Imaging Modes

OCT, ultrasound, and opto-acoustic imaging technologies can each provide depth-resolved imaging from a suitably configured intraoral scanner. Each of these depth-resolved imaging modes direct a series of depth-probing output imaging signals to the scanned surface location, using generated signal energy that is capable of penetrating beneath the surface of tissue to provide depth-resolved image content in addition to surface contour information. Depth-resolved imaging modes such as OCT, ultrasound, and opto-acoustic imaging can obtain imaging data for surface contour reconstruction as well as provide useful information related to features that lie beneath the surface of the imaged tissue, accurate to some depth, depending on the limitations of the signal energy that is used. In addition to depth-related information, various depth-resolved imaging apparatus and methods can also provide useful data on feature density, distribution, and dimension.

Example embodiments of the present disclosure can use depth-resolved imaging to address the need for enhanced characterization of the teeth and other intraoral features. Using the added information obtained from depth-resolved images, the methods of such example embodiments add dimension and further utility to the dental chart that is maintained for the patient, supplementing the standard tooth-by-tooth assessment that is conventionally obtained by visual examination with data that was previously hidden below the surface.

The description that follows focuses on OCT image acquisition, using OCT as an exemplary type of depth-resolved imaging system that can be used for enhanced characterization and generation of a dental chart in an automated manner. It should be appreciated and understood, however, that similar processing and methods can be used for assembling surface content with alternative depth-resolved imaging types such as, for example, when using ultrasound and optoacoustic imaging.

Advantageously, the depth-resolved image content is acquired using the same scanner that obtains reflectance and fluorescence images. By combining the image acquisition functions in a single intraoral scanner, methods of the present disclosure address problems of spatial and temporal synchronization that limited the utility, accuracy, and practicality of previous imaging solutions.

Example embodiments of the present disclosure can utilize results acquired from an apparatus that performs depth-resolved imaging such as optical coherence tomography (OCT) in order to generate a dental chart and to populate the generated dental chart with results from image analysis that support recognition of likely conditions for teeth and gums. OCT results can be combined with 3-D surface contour imaging results and analysis acquired using the same imaging apparatus, obtained concurrently and in register with the OCT data.

Subsequent description gives more detailed information on OCT and multimodal imaging subsystems that can be used to provide dental chart content according to an example embodiment of the present disclosure. It should be appreciated and understood that the multimodal imaging apparatus, scanner 314 in FIG. 1, can acquire any of a number of types of image data, all registered to a shared set of spatial coordinates.

OCT Imaging Subsystem

OCT has been described as a type of "optical ultrasound", imaging reflected energy from within living tissue to obtain cross-sectional data. In an OCT imaging system, light from a wide-bandwidth source, such as a super luminescent diode (SLD) or other light source, is directed as a depth-probing output signal along two different optical paths: a reference arm of known length and a sample arm that illuminates the tissue or other subject under study. Reflected and back-scattered light from the reference and sample arms is then recombined in the OCT apparatus and interference effects are used to determine characteristics of the surface and near-surface underlying structure of the sample. Interference data can be acquired by rapidly scanning the sample illumination across the sample. At each of several thousand points, the OCT apparatus obtains an interference profile which can be used to reconstruct an A-scan with an axial depth into the material that is a factor of light source coherence. For most tissue imaging applications, OCT uses broadband illumination sources and can provide image content at depths of up to a few millimeters (mm).

Initial OCT apparatuses employed a time-domain (TD-OCT) architecture in which depth scanning was achieved by rapidly changing the length of the reference arm using, for example, some type of mechanical mechanism, such as a piezoelectric actuator. TD-OCT methods use point-by-point scanning, requiring that the illumination probe be moved or scanned from one position to the next during the imaging session. More recent OCT apparatuses can use a Fourier-domain architecture (FD-OCT) that discriminates reflections from different depths according to the optical frequencies of the signals they generate. FD-OCT methods simplify or eliminate axial scan requirements by collecting information from multiple depths simultaneously and offer improved acquisition rate and signal-to-noise ratio (SNR).

Because of their potential to achieve higher performance at lower cost, FD-OCT systems based on swept-frequency laser sources have attracted significant attention for medical applications that require subsurface imaging in highly scattering tissues. There are two implementations of Fourier-domain OCT: spectral domain OCT (SD-OCT) and swept-source OCT (SS-OCT).

SD-OCT imaging can be accomplished by illuminating the sample with a broadband illumination source and dispersing the reflected and scattered light with a spectrometer onto an array detector such as, for example, a CCD (charge-coupled device) detector. SS-OCT imaging illuminates the sample with a rapid wavelength-tuned laser and collects light reflected during a wavelength sweep using only a single photodetector or balanced photodetector. With both SD-OCT and SS-OCT, a profile of scattered light reflected from different depths is obtained by operating on the recorded interference signals using Fourier transforms, such as Fast-Fourier transforms (FFT), well known to those skilled in the signal analysis arts.

A recent advance for swept-source OCT imaging is the use of a Fourier Domain Mode Locking (FDML) laser source. FDML-OCT scanning offers significant increases in acquisition speed for OCT sampling, as well as increased depth resolution over other OCT types.

Example embodiments of the present disclosure can utilize any of the various types of OCT scanning methods, including time-domain, spectral, or frequency-domain OCT. Because the speed advantage is of particular interest, the description that follows is primarily directed to example embodiments that employ swept-source OCT, a type of frequency-domain OCT that is generally advantageous for faster speed and overall scanning throughput. However, it should be noted that the compressive sampling methods or other available OCT methods can be used to improve the response of time-domain OCT and other types of OCT as well as with SS-OCT. Methods of the present disclosure can also be used where a spectrometer is used for sensing in the OCT system.

According to an example embodiment of the present disclosure, there is provided a hybrid imaging apparatus that obtains OCT scanned data with accompanying color texture content for intraoral features, along with fluorescence image content. The image content that is generated is provided using the same optical probe.

Figure 2:
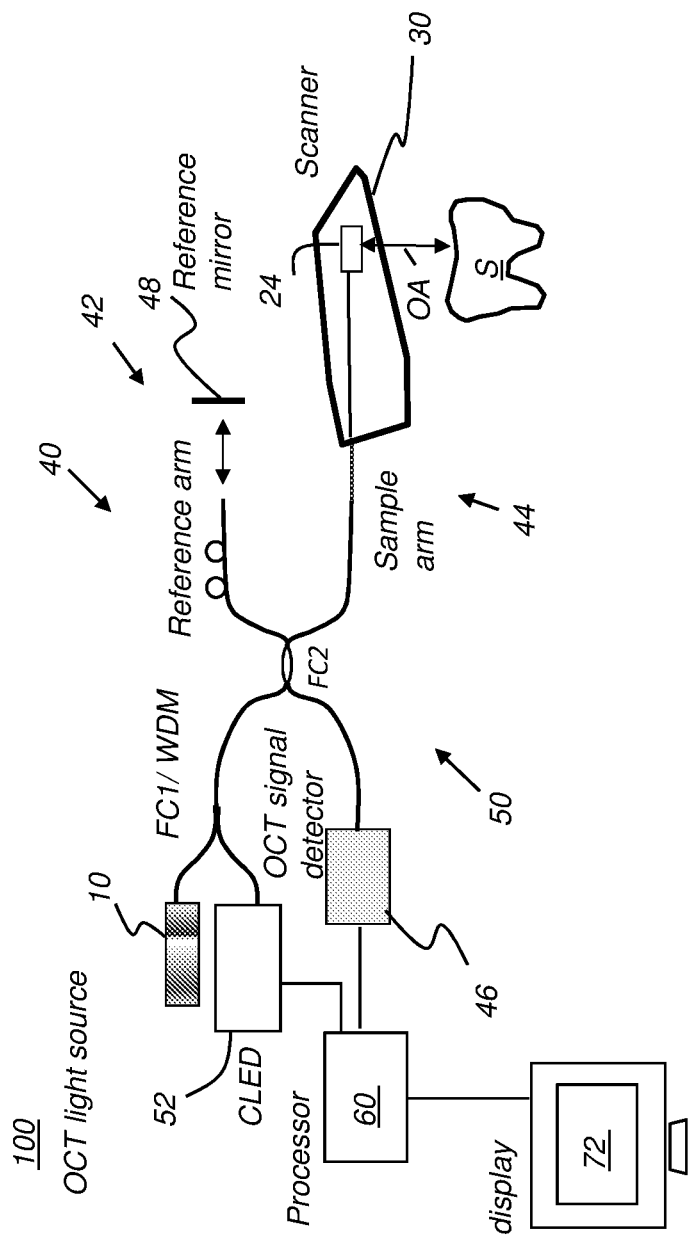
FIG. 2 is a schematic diagram showing an alternate example embodiment for an imaging apparatus for combined OCT ("Optical Coherence Tomography") scanning and color image acquisition.

Referring to the schematic diagram of FIG. 2, an imaging apparatus 100 is shown for multimodal image acquisition that combines OCT scanning, reflectance imaging, and fluorescence image acquisition modes, and wherein the image data for each mode shares the same spatial registration. Having identical spatial registration relates to acquiring image content, from each mode, with reference to the same sensor position and orientation and obviates the need for mapping of one type of image to another.

Imaging apparatus 100 has an intraoral probe 30 that combines the light paths for directed and acquired light of different/multiple imaging modes along a common or shared optical path, shown as an optical axis OA in FIG. 2 and extending outside probe 30. The distinct directed output and acquired input signals can then be separated and channeled to/from the corresponding optical subsystems within probe 30.

For example, in an OCT light path 40, an OCT light source 10 provides illumination for OCT image scanning. Light source 10 can employ a super luminescent diode (SLD) or other source that emits continuous wavelength broadband light. Alternately, light source 10 can be some other type of suitable light source, such as a swept source that emits light with continuously varying spectral content. One advantaged type of swept source is a Fourier Domain Mode Locking (FDML) laser having a high sweep rate and suitable wavelength range for depth-resolved imaging.

In the FIG. 2 configuration, the coherent laser light is directed through a first fiber coupler FC1 or wavelength division multiplexer WDM to a second fiber coupler FC2. Fiber coupler FC2 splits the light path into a reference arm 42 and a sample arm 44. Light in reference arm 42 reflects back from a reference mirror 48 This light is coupled back through fiber coupler FC2 and goes to OCT signal detector 46. Light directed to sample arm 44 is directed to the subject or sample S by a scanner 24. For intraoral imaging, sample "S" is a surface location of the patient's mouth, which can include one or more teeth along with gums and other supporting features. For OCT depth-resolved image acquisition, reflected and scattered light from sample "S" is coupled back through sample arm 44 to fiber coupler FC2 and is conveyed to OCT signal detector 46. The light from reference arm 42 interferes with light from reference arm 44 to provide the OCT scan data for processing and reconstruction.

In a color reflectance imaging path 50, polychromatic or color light is emitted from a color light emitter/detector (CLED) 52 and directed through fiber coupler FC1 or WDM to the second fiber coupler FC2. Coupler FC2 acts as a combiner/separator. The polychromatic visible light is combined with the OCT sample light and is simultaneously directed to sample "S" through an output scanner 24, part of intraoral probe 30. Returned reflected color light from the surface location, such as the surface of the tooth or other intraoral feature, is conveyed through fiber coupler FC2 back to CLED 52. CLED 52 senses the color content from the reflected light to form a reflectance image of sample "S". A control logic processor 60 is in signal communication with OCT signal detector 46, CLED 52, and light source 10 to record and process the OCT output data from interference and combine this data with the color data from the intraoral surface. The resulting combined image content can then be presented on a display 72 and can alternately be communicated, transmitted, and/or stored.

The reflectance image can be used for a variety of purposes, such as to provide a high resolution 2D intraoral image for documentation and patient communication. Its color content (e.g. R, G, and B image values) can also be used for determining the shade of a tooth.

Fluorescence imaging employs components of reflectance imaging path 50, optionally using a separate light source for directing excitation illumination of a suitable wavelength range for stimulating the surface location to generate fluorescent light image content. In this case, a long-pass spectral filter can be used in the detector of CLED 52 to sense the fluorescent light signal, forming a fluorescence image of sample "S".

Figure 3:
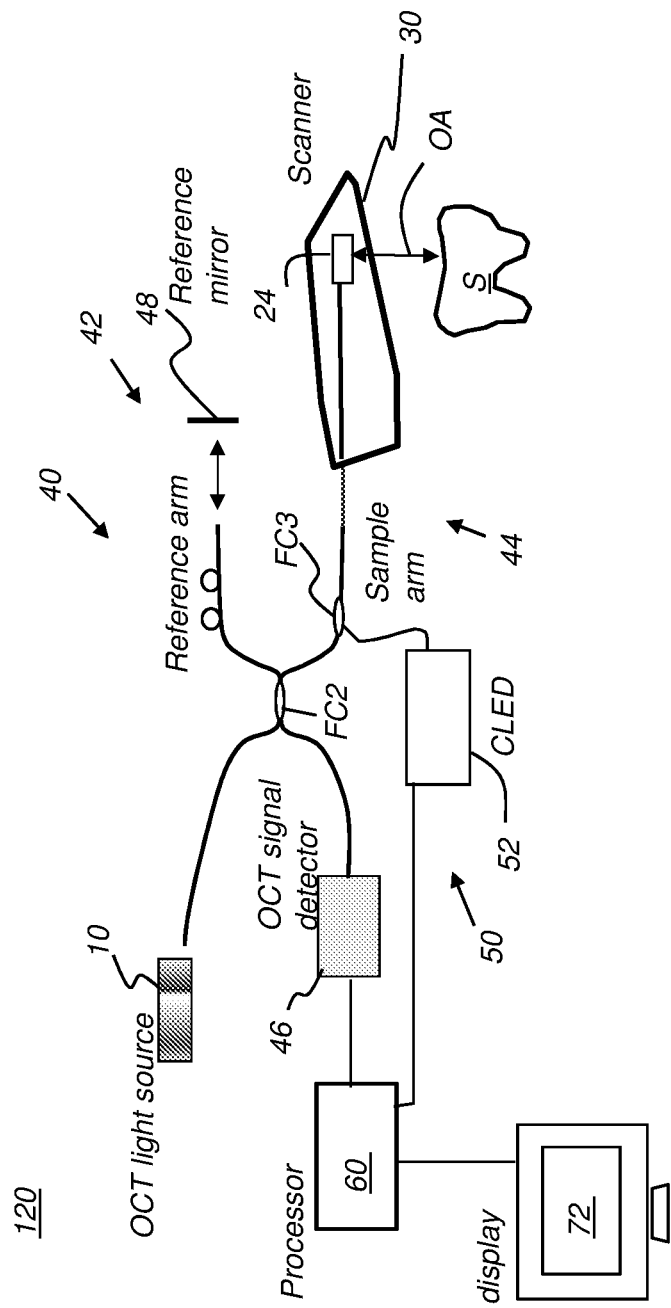
FIG. 3 is a schematic diagram showing another alternate example embodiment for an imaging apparatus for multimodal image acquisition.
Figure 4:
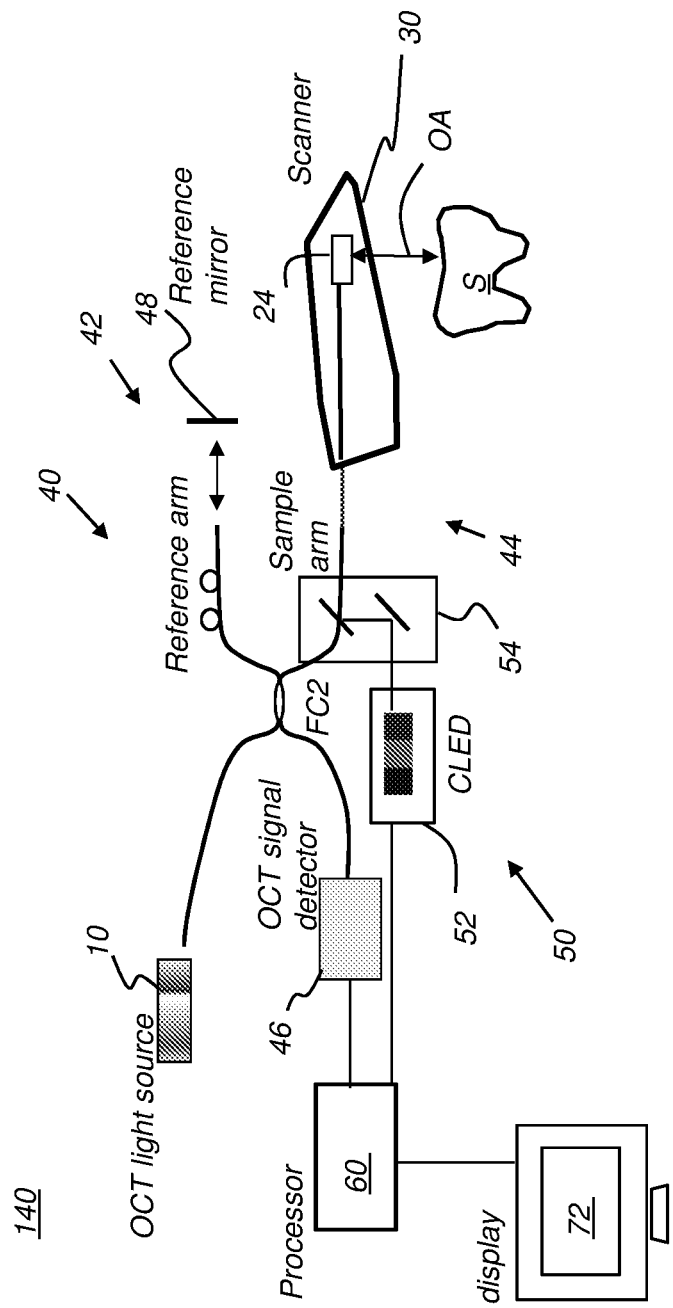
FIG. 4 is a schematic diagram showing yet another alternate example embodiment for an imaging apparatus for multimodal image acquisition.

The schematic diagrams of FIGS. 3 and 4 show similar imaging apparatuses 120 and 140, respectively, having slightly different light path arrangements for combining the OCT and reflectance imaging functions. In the FIG. 3 arrangement of imaging apparatus 120, the OCT path can be the same as that described previously with respect to imaging apparatus 100 in FIG. 2. The light from color light emitter/detector (CLED) 52 is directed through a fiber coupler FC3 and shares the sample arm with OCT light. This combined light is directed to the subject or sample "S" through scanner 24. Backscattered color light from the intraoral surface is conveyed through fiber coupler FC3 to color light emitter/detector (CLED) 52 to measure the color content, recorded and processed by processor 60. The resulting combined image content can then be presented on a display 72 and can alternately be communicated, transmitted, and/or stored.

In the FIG. 4 configuration of imaging apparatus 140, the OCT path is the same as that described previously with respect to imaging apparatus 100 in FIG. 2. The light from color light emitter/detector (CLED) 52 is directed into the sample path through a dichroic combiner 54, that has a reflective surface and a dichroic surface in the configuration shown. Backscattered color light from the intraoral surface is conveyed back to CLED 52 through combiner 54 for detection and measurement, recorded and processed by processor 60. The resulting combined image content can similarly be presented on a display 72 and can alternately be communicated, transmitted, and/or stored.

According to an example embodiment of the present disclosure, the different signals that are directed from the scanner to an intraoral surface location share a common axis.

Scanning Method for OCT Imaging

Figure 5A:
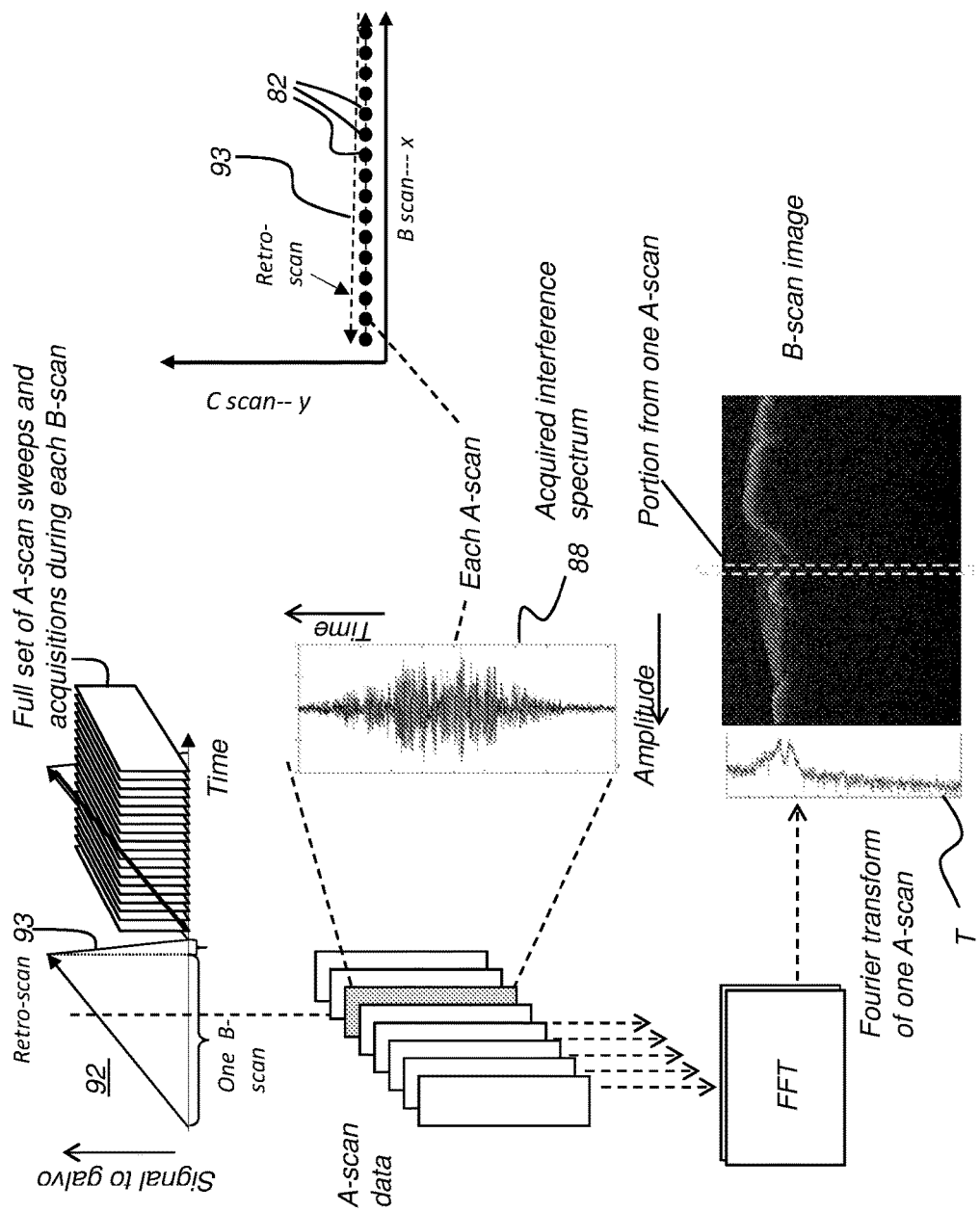
FIGS. 5A and 5B show functional and geometric aspects of OCT imaging.
Figure 5B:
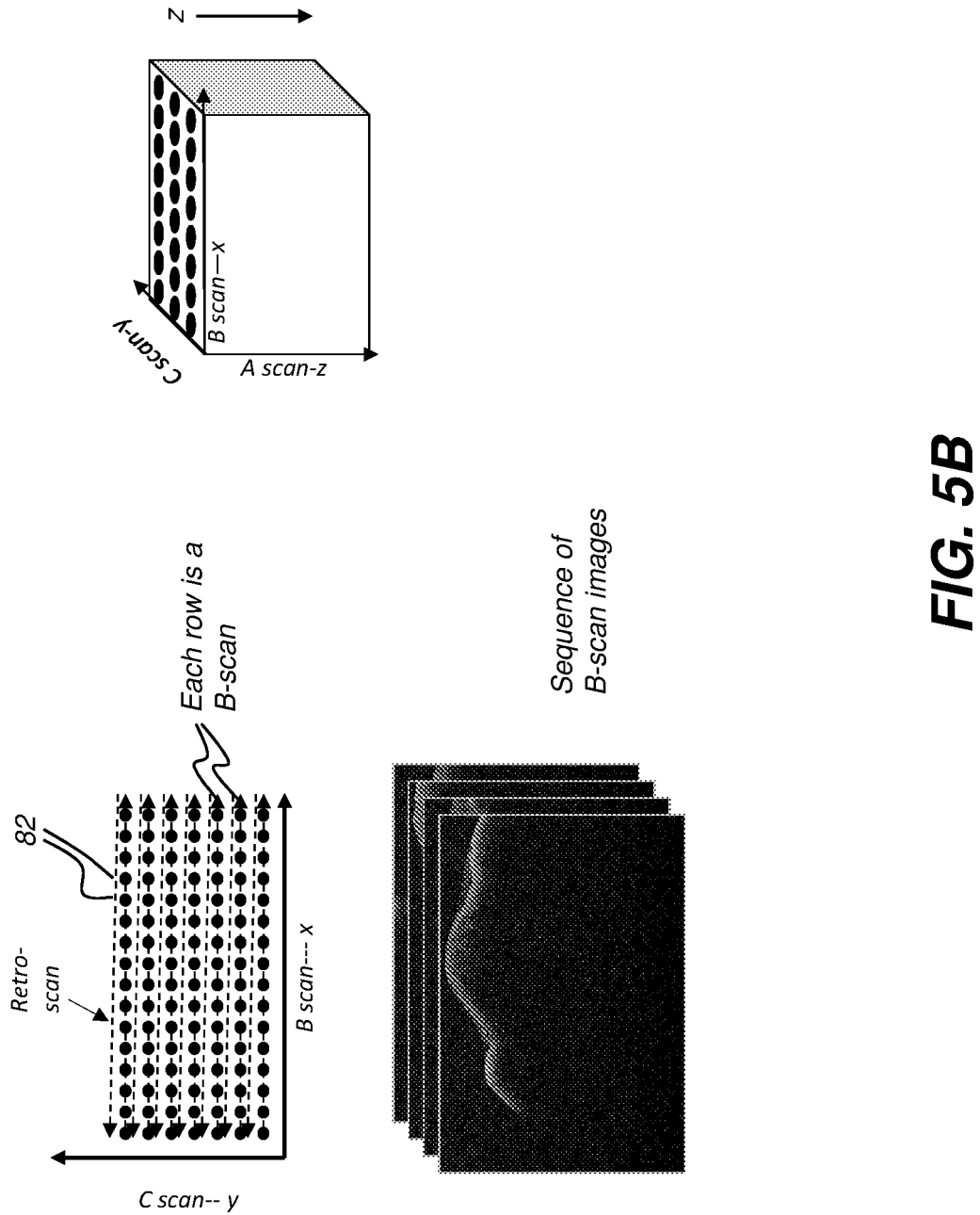

The schematic diagrams of FIGS. 5A and 5B show a scan sequence that can be used for forming tomographic images using the OCT apparatus of the present disclosure in a Fourier domain acquisition. The sequence shown in FIG. 5A shows how a single B-scan image is generated. Raster scanner 24 (FIG. 2) scans the selected light sequence over the subject, sample "S", point by point. A periodic drive signal 92, as shown in FIG. 5A, is used to drive the raster scanner 24 galvo mirrors to control a lateral scan or B-scan that extends across each row of the sample, shown as discrete points 82 extending in the horizontal direction in FIGS. 5A and 5B. At each of a plurality of points 82 along a line or row of the B-scan, an A-scan or depth scan, acquiring data in the z-axis direction, is generated using successive portions of the selected wavelength band. FIG. 5A shows drive signal 92 for generating a straightforward ascending sequence using raster scanner 24, with corresponding micro-mirror actuations, or other spatial light modulator pixel-by-pixel pixel actuation, through the wavelength band. The retro-scan signal 93, part of drive signal 92, simply restores the scan mirror back to its starting position for the next line. No OCT data is obtained during retro-scan signal 93.

It should be noted that the B-scan drive signal 92 drives the galvo mirror of scanner 24 for raster scanner 90 as shown in FIGS. 2-4. At each incremental position, point 82 along the row of the B-scan, an A-scan is obtained. To acquire the A-scan data, the tuned laser or other OCT light source sweeps through a spectral sequence controlled by a programmable filter in the OCT source 10. Thus, in an example embodiment in which the light source sweeps through a 30 nm range of wavelengths, this sequence is carried out at each point 82 along the B-scan path. As FIG. 5A shows, the set of A-scan acquisitions executes at each point 82, that is, at each position of the scanner 24. By way of example, there can be 2,048 measurements for generating the A-scan at each position 82.

FIG. 5A schematically shows the information acquired during each A-scan. An interference signal 88, shown with DC signal content removed, is acquired over the time interval for each point 82, wherein the signal is a function of the time interval required for the spectral sweep, with the signal that is acquired indicative of the spectral interference fringes generated by combining the light from reference and feedback arms of the OCT interferometer components. The Fourier transform generates a transform T for each A-scan. One transform signal corresponding to an A-scan is shown by way of example in FIG. 5A.

From the above description, it can be appreciated that a significant amount of data is acquired over a single B-scan sequence. In order to process this data efficiently, a Fast-Fourier Transform (FFT) is used, transforming the time-based signal data to corresponding frequency-based data from which image content can more readily be generated.

In Fourier domain OCT, the A-scan corresponds to one line of spectrum acquisition which generates a line of depth (z-axis) resolved OCT signal. The B-scan data generates a 2D OCT image along the corresponding scanned line.

Raster scanning is used to obtain multiple B-scan data by incrementing the raster scanner 24 acquisition in the C-scan direction. This is represented schematically in FIG. 5B, which shows how 3D volume information is generated using the A-scan, B-scan, and C-scan data.

As noted previously, the wavelength or frequency sweep sequence that is used at each A-scan point 82 can be modified from the ascending or descending wavelength sequence that is typically used. Arbitrary wavelength sequencing can alternately be used. In the case of arbitrary wavelength selection, which may be useful for some particular implementations of OCT, only a portion of the available wavelengths are provided as a result of each sweep. In arbitrary wavelength sequencing, each wavelength can be randomly selected, in arbitrary sequential order, to be used in the OCT system during a single sweep.

Multimodal Imaging Sequence

Figure 6:
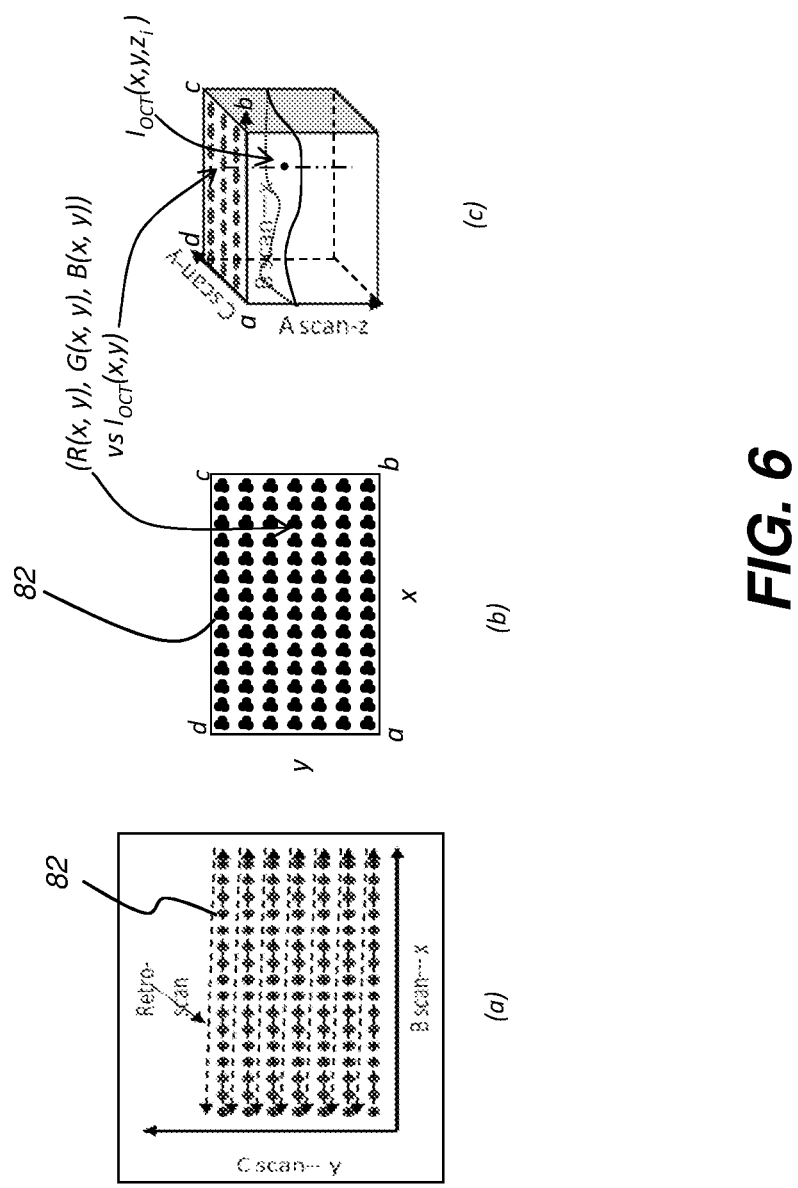
FIG. 6 shows a combined OCT and color scanning sequence in schematic form.

FIG. 6 shows the combined OCT and color scanning scheme in schematic form. Scanner 24 steers both the color light beam and OCT light beam to sample "S" in a two-dimensional (x, y) raster scan at each point 82, with $x \in [0, L-1]$ indexed along the x scanning axis. The orthogonal component, $y \in [0, M-1]$ is indexed along the y scanning axis. The color signal with three reflectance values (R(x, y), G(x, y), B(x, y)) and the OCT signal $I_{OCT}(x, y)$ with dimension "N" (for "N" data points) in the depth direction are acquired corresponding to each scanned position (x, y).

When the 2D scanner 24 scans continuously, a 2D color image is populated with a number L×M of color pixels; correspondingly a 3D OCT volume is reconstructed with values L×M×N. The (R(x, y), G(x, y), B(x, y)) values are inherently registered with $I_{OCT}(x, y)$ along lateral directions. FIG. 6 part (b) shows the inherent mapping provided for the color content at each point 82 corresponding to the OCT scan, with values (R(x, y), G(x, y), B(x, y)) mapped to corresponding $I_{OCT}(x, y)$ measurements. FIG. 6 part (c) shows $I_{OCT}(x, y, z_i)$ with the surface point intensity at (x, y, $z_i$), wherein $z_i$ is depth of surface from a zero-delay line along the A-line OCT signal. The color texture (R(x, y), G(x, y), B(x, y)) is thus mapped directly to the OCT signal at (x, y, $z_0$).

An example embodiment of the present disclosure preserves the spatial mapping of data from different imaging modes, including OCT and reflectance imaging, in the surface reconstruction that is formed. The dental chart that is generated from the surface reconstruction can then incorporate data on multiple characteristics of teeth, gums, and other features without the need for separate alignment processing from different types of scanning. This arrangement not only allows the dental chart to be generated without a separate alignment step, but also allows straightforward updating of dental chart contents using subsequent scans. Thus, for example, a complete scan can be used for initial generation of the dental chart, incorporating reflectance image content, color shade, 3D surface profiles, OCT depth-resolved data, and fluorescence data, and preserving the spatial association of each data type. Subsequent to this initial scan, a partial scan can be performed, such as scanning an implant site, an individual tooth requiring treatment, or other partial portion of the dentition. Reconstructed surfaces of the new scan can be stitched to the 3D surfaces of the dental arch initially generated. Updated information for the scanned portion, including updated data from multiple modes, can then be readily aligned with the previously scanned content and used to modify the existing dental chart.

CLED Structure and Functional Components

Figure 7A:
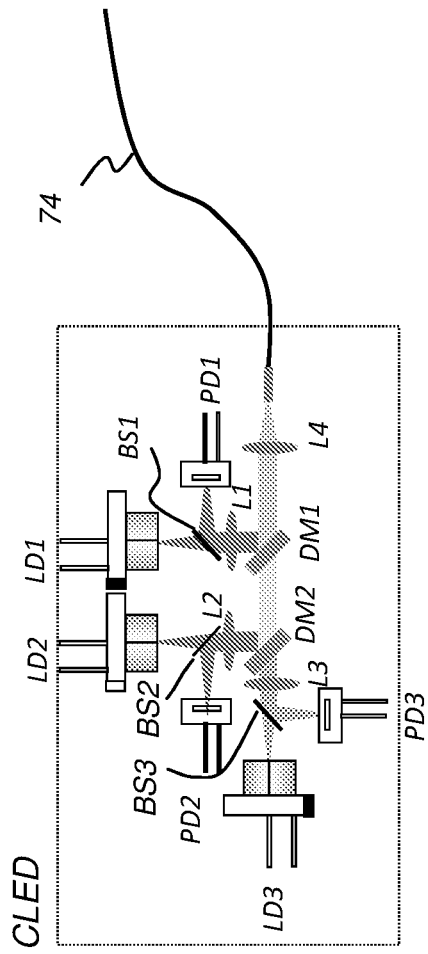
FIGS. 7A through 7G show various embodiments of a color light emitter/detector.
Figure 7B:
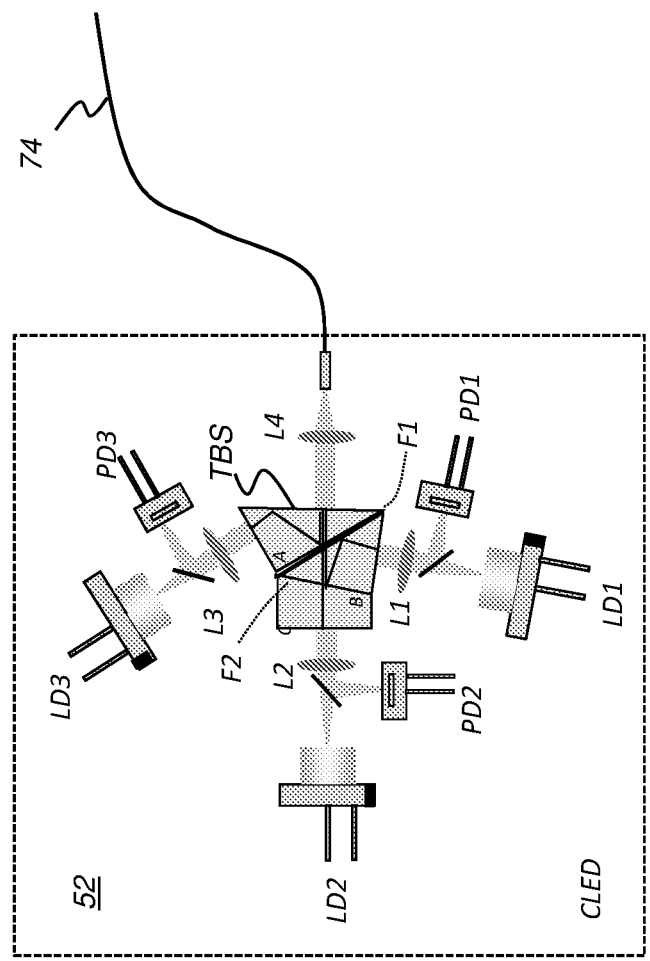
Figure 7C:
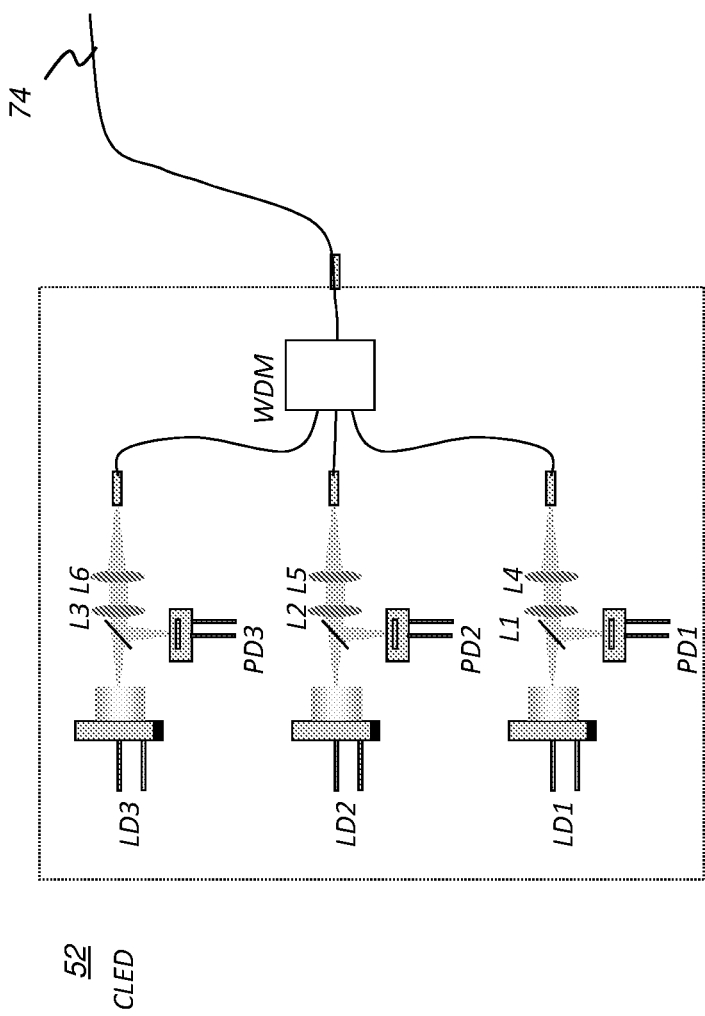

FIGS. 7A, 7B, and 7C show different example embodiments of color light emitter/detector CLED 52. Laser diodes LD1, LD2, and LD3 are red, green and blue laser diodes, respectively. Lenses L1, L2 and L3 are the corresponding collimation lenses used with each of LD1, LD2, and LD3 to generate collimated light beams.

In the FIG. 7A arrangement, collimated beams are combined onto the same light path by dichroic mirrors DM1 and DM2. Mirrors DM1 and DM2 have appropriate cutoff wavelengths for corresponding routing of light to and from the light path, such as center wavelengths of red and green laser diodes LD1 and LD2. Lens L4 couples the light from the shared path into a single mode optical fiber 74 to provide full color or polychromatic light. Full color light that has been backscattered from the sample "S" is coupled back to CLED 52. Each color light is coupled back to its original channel through beam splitters BS1, BS3, and BS3 and a portion of the light power is directed to corresponding photodiodes PD1, PD2, and PD3 for measurement.

In the FIG. 7B configuration, a trichroic beam splitter TBS with dichroic filters F1 and F2, similar to a Philips prism, combines the light from Red, Green, and Blue laser diodes LD1, LD2, and LD3 onto optical fiber 74, coupled through lens L4. Full color light that has been backscattered from the subject, sample "S", is coupled back to CLED 52. Each color light is coupled back to its original channel through trichroic beam splitter TBS.

In the FIG. 7C configuration, a wave division multiplexer WDM is used for combining and separating the Red, Green, and Blue light from their respective color channels.

Figure 7D:
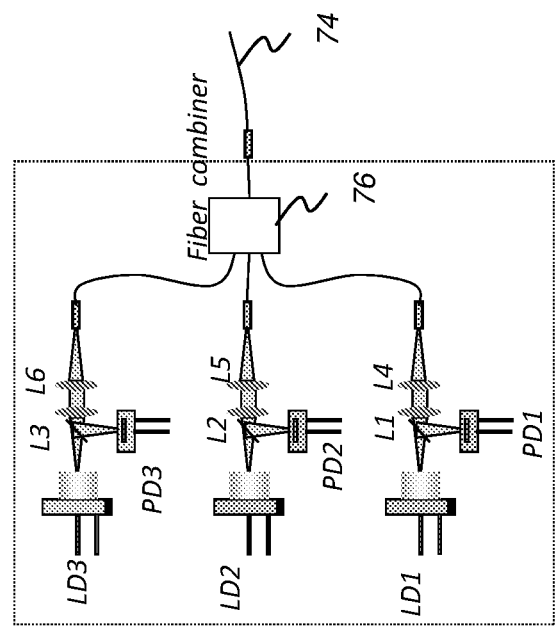

In the FIG. 7D configuration, a fiber combiner 76 is used for combining and separating the Red, Green, and Blue light from their respective color channels.

Figure 7E:
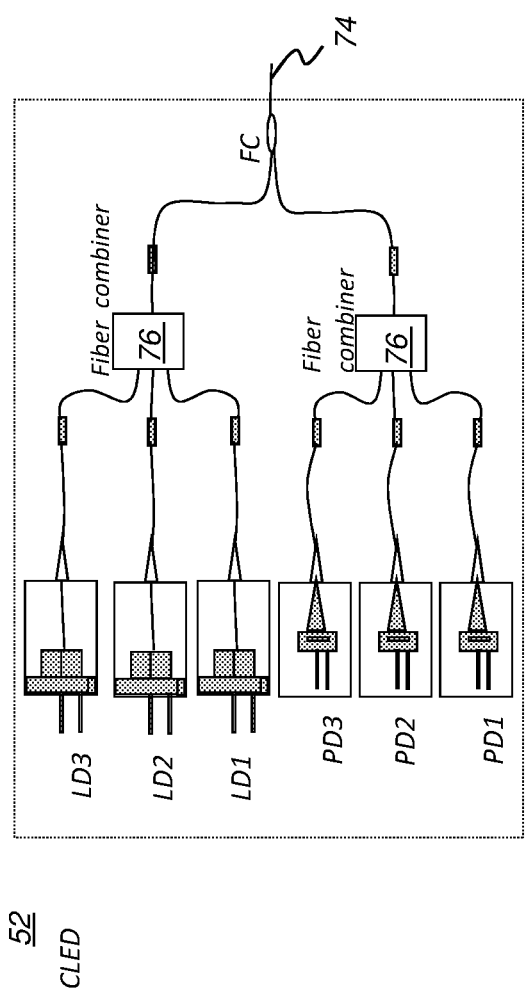

In the FIG. 7E configuration, two fiber combiners 76 are used, one for combining the outgoing Red, Green, and Blue light onto a single channel, the other for separating the returned Red, Green, and Blue light to their respective color channels.

Figure 7F:
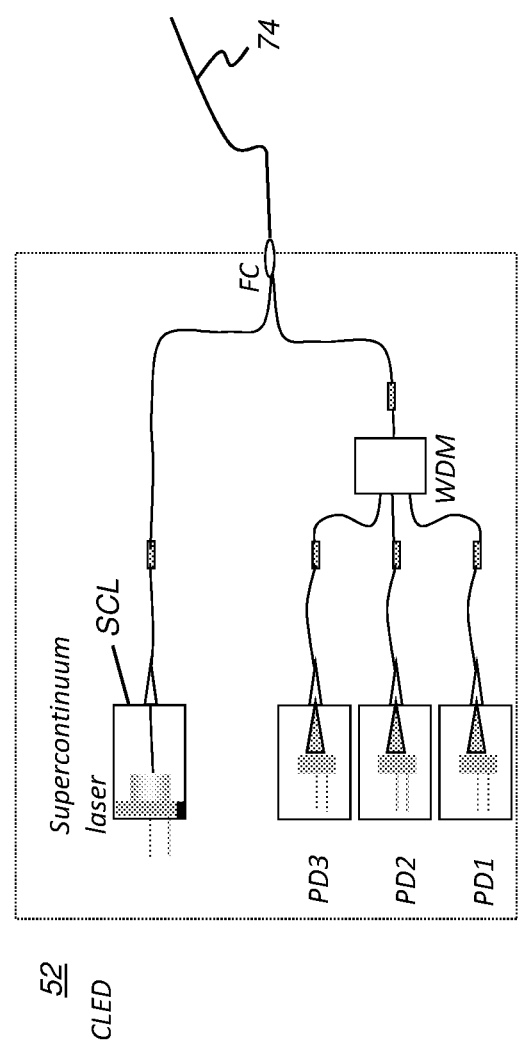

In the FIG. 7F configuration, a wide-bandwidth visible light source, such as a supercontinuum laser SCL, serves as the light source for color imaging. The SCL has a continuous visible spectrum output. Wavelength division multiplexer WDM in the path of returned light separates the backscattered light and redirects the light to each respective photodiode PD1, PD2, PD3. A fiber coupler FC is used to couple the light to and from fiber 74.

Figure 7G:
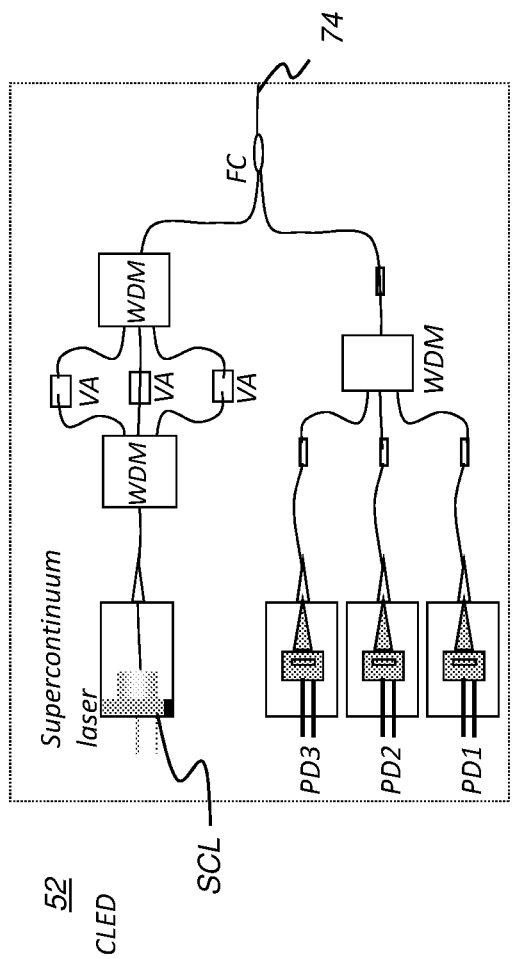

In the FIG. 7G configuration, a pair of wave division multiplexers WDM and variable attenuators VA are used to modulate the SCL light in the emission path. A WDM in the path of returned light separates the backscattered light and redirects the light to each respective photodiode PD1, PD2, PD3. A fiber coupler FC is used to couple the light to and from fiber 74.

Figure 7H:
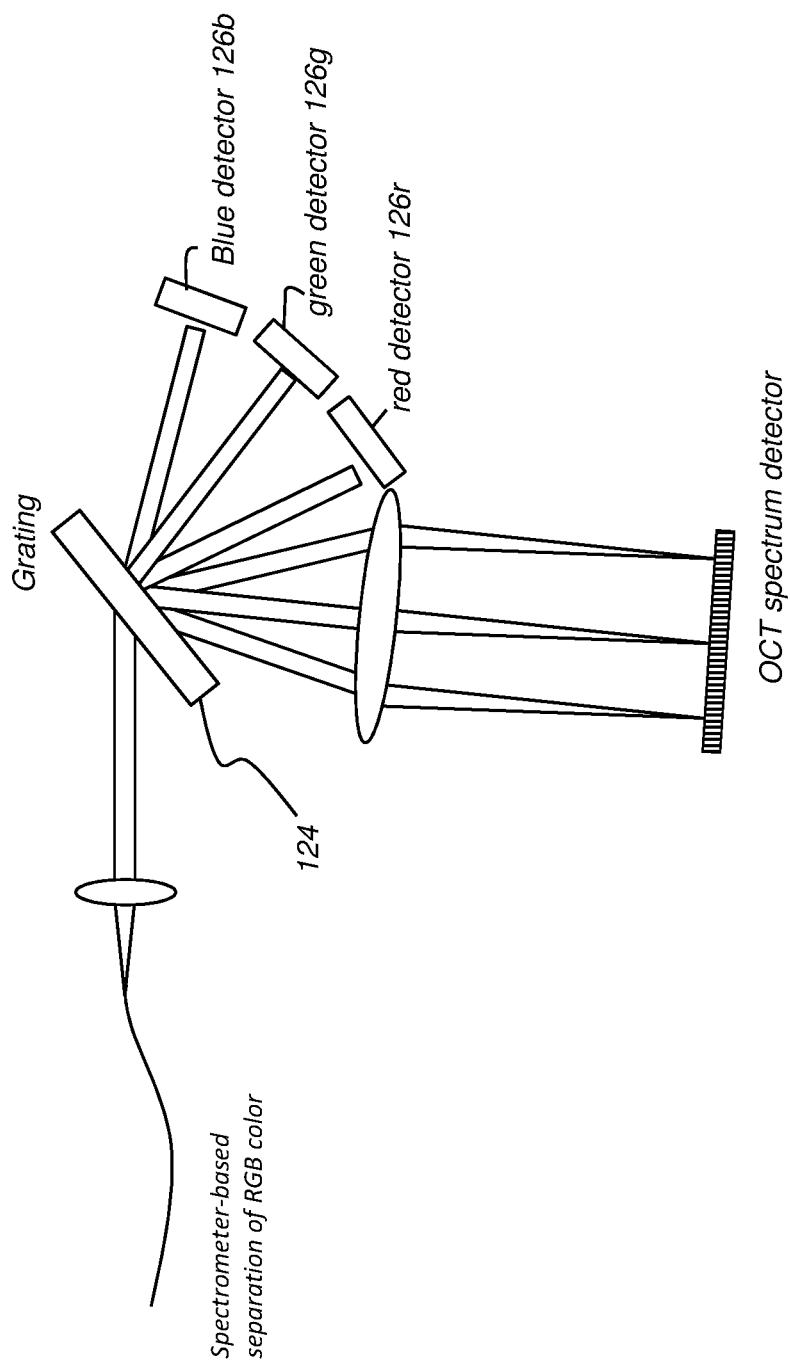
FIG. 7H shows an example embodiment in which RGB ("Red Green Blue") light detection is performed at the OCT spectrometer.

The FIG. 7H configuration shows an example embodiment in which RGB light detection is performed at the OCT spectrometer. Input polychromatic light is coupled to the OCT scanning system, as shown in previous FIGS. 7A-7G. Detection of the polychromatic light utilizes a spectral separator 124, such as a grating or prism to provide spectral separation of the light, directing red, green, and blue light to corresponding detectors 126r, 126g, 126b at appropriate angles, as determined by grating, prism, or other separator characteristics.

Light Source Options

Visible light Vis used in the scanner optics can be of multiple wavelengths in the visible light range. The Vis source can be used, for example, for color-coding of the projected structured light pattern. The Vis source can alternately be used for white light image preview or for tooth shade measurement or color or texture characterization.

Vis light can be provided from a conventional bulb source or may originate in a solid-state emissive device, such as a laser or one or more light-emitting diodes (LEDs). Individual Red, Green, and Blue LEDs are used to provide the primary color wavelengths for reflectance imaging.

In addition to providing a structured light pattern, the Vis source can alternately provide light of particular wavelengths or broadband light that is scanned over the subject for conventional reflectance imaging such as, for example, for detecting tooth shade or for obtaining surface contour data by a method that does not employ a light pattern such as, for example, structure-from-motion imaging.

A violet light, in the near-UV region can be used as the excitation light for tooth fluorescence imaging. Backscattered fluorescence can be collected by the OCT light path. The fluorescence image can be detected by the same detector path of the Fourier domain OCT, but at a different lateral spectrum location.

Color Image Processing and Calibration

For system calibration and imaging, the reflectance imaging apparatus should be calibrated to a reference standard. R, G, B laser emission is adjusted to provide balanced light intensities. Background signals are captured with sample "S" removed from the sample arm. The R, G, B photodiodes, PD1, PD2, and PD3, respectively, detect background signals that are reflected from the components in the light path. Background signals are subtracted from the R, G, and B signals, respectively. The color image calibration method is similar to that used in color photography which is also adapted in the calculation flowchart of FIG. 8.

Figure 8:
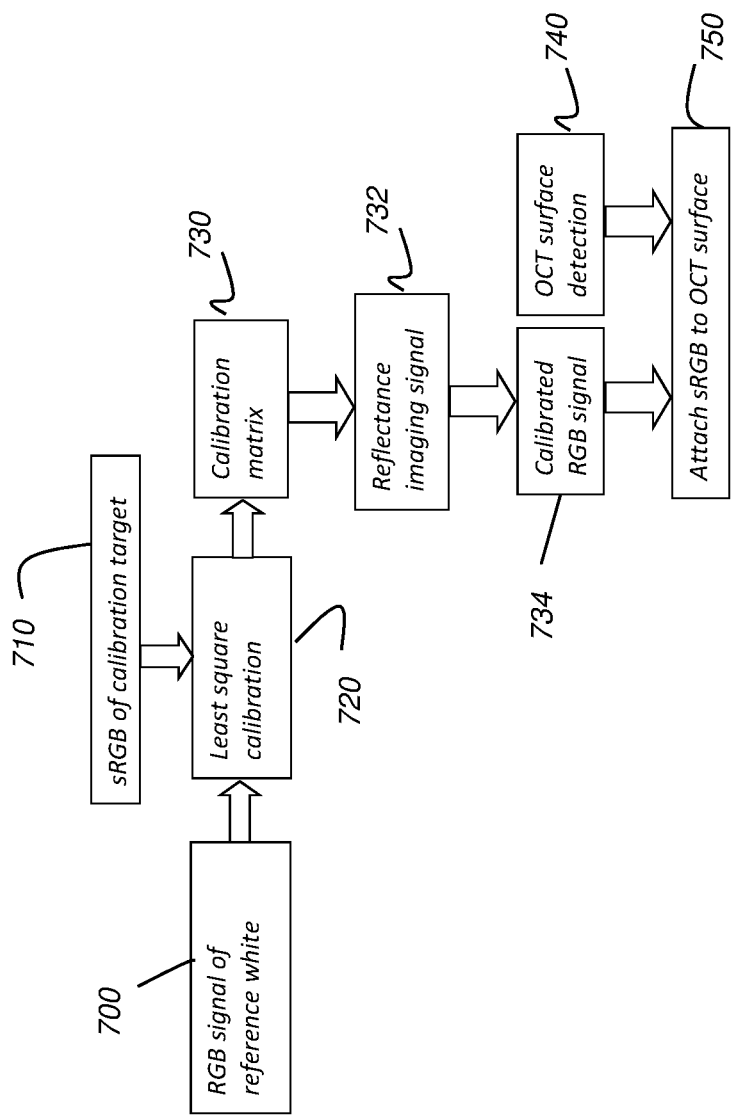
FIG. 8 is a flowchart that shows an example method for combined color calibration.

FIG. 8 shows a color calibration sequence that can be used for the color scanner that performs both OCT and RGB imaging. RGB signals are obtained from a calibration target, such as a gray or white light reference patch, in a reference imaging step 700. Values from a standard color model such as sRGB of the reference white patch or other calibration target are acquired in a standard color model step 710. A least squares calculation or other suitable method for obtaining the calibration transform between the RGB signals and sRGB is performed at a calibration step 720, generating a calibration matrix at a transform step 730. The calibration matrix is applied to the RGB signals obtained from a reflectance imaging step 732 to generate a calibrated RGB signal 734. This is combined with OCT surface detection obtained in an OCT surface imaging step 740. An attachment step 750 then combines the OCT surface detection data in register with calibrated RGB data to provide a combined output.

The difference in spectral ranges for the two imaging modes makes the combination of OCT light and RGB color light possible, either using spectral division or amplitude division.

Figure 9:
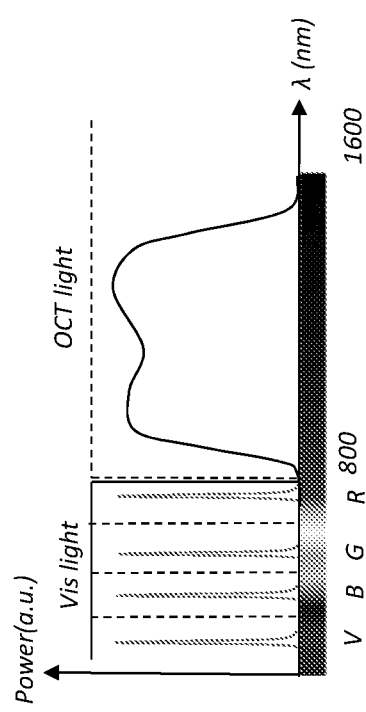
FIG. 9 is a graph that shows spectral ranges for OCT and reflectance imaging.

FIG. 9 shows the spectrum distribution of visible R, G, B light and infrared OCT light waves. As can be readily seen from this mapping, the spectral wavelength ranges are non-overlapping. Visible light ranges from wavelengths of about 380 nm to about 740 nm. The infrared light ranges from wavelengths above 740 nm to about 1600 nm. FIG. 9 also shows related dichroic mirror cut off and bandpass wavelengths for WDM operation. Additional color content can be added to provide more accurate shade matching, such as a violet V wavelength (less than about 450 nm), as shown in the spectral diagram of FIG. 9.

Illumination for fluorescence imaging can be at wavelengths near the visible blue region, or in the violet or ultraviolet range.

An alternate approach to meeting the need for combined OCT and color texture image data uses an OCT scanner that is coupled with a color preview camera for obtaining the needed image content. When using this alternate approach, processing is needed in order to register the color texture data with the OCT scan content.

Preserving the Association of Image Data with Corresponding Surface Location

In each of the FIGS. 2-4 configurations, CLED signal detection and OCT signal detection can be synchronized and share the same optical path in the sample arm to and from the sample probe 30 and its scanner 24.

With high-rate image acquisition for different modes, a substantial amount of image content can be obtained in a single scan using imaging apparatus 100. Instead of requiring some type of manual "mode-switching" or requiring a change in scanning practices, imaging apparatus 100 can be configured for multimode operation so that each scan of the patient's mouth can acquire image content in multiple modes. With this arrangement, the different types of image content obtained in each scan can be integrated in surface reconstruction, stitching, and display of the complete dental arch. Data that identifies each imaged surface location, typically identified using Cartesian x, y, z coordinates, can be spatially associated with each type of image data that is acquired at that surface location.

Figure 10A:
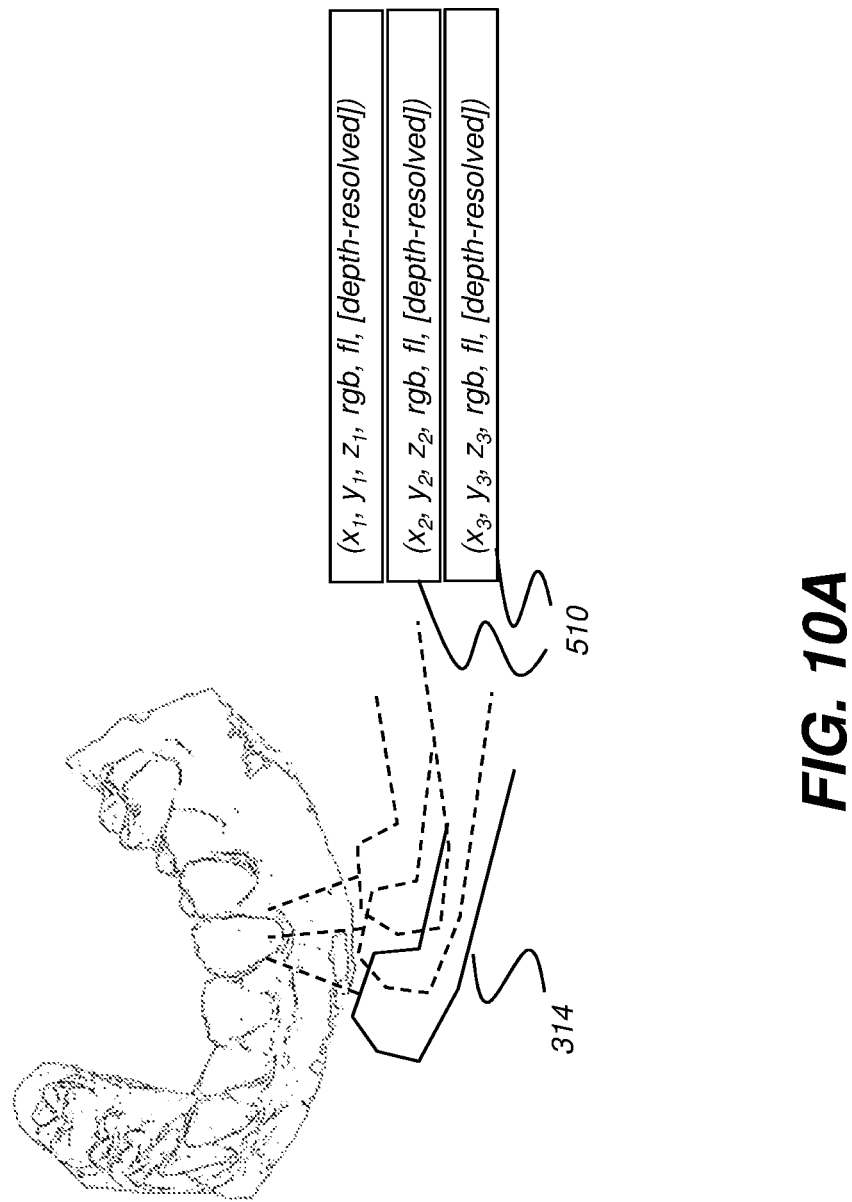
FIG. 10A is a schematic diagram that shows an association of acquired image content to each scanned x, y, z location in the scanner field of view.

Referring to the schematic diagram of FIG. 10A, an association of acquired image content to each scanned x, y, z spatial location in the scanner 314 field of view is shown. Repeated execution of the imaging acquisition sequence during the scan, 3D surface reconstruction, and stitching generates an association between the acquired image content and the calculated x, y, z location coordinates. This spatial association can be formed, stored, and represented in various ways. The FIG. 10A example shows generating a set of association vectors 510 corresponding to each scanned location of the patient dentition. The vector 510 data structure is merely one example mechanism for representing the association obtained between the spatial location (x, y, z) and the data acquired at that location.

According to an example embodiment of the present disclosure, preserving the association of spatial coordinates with the results of tissue response to a signal follows a similar sequence for each imaging mode. Working backward from the reconstruction and stitching, control logic can relate one image frame to each surface point such as by using the image frame orthogonal to a vector that is orthogonal to the surface point. The data value corresponding to a particular point in the frame can be the most accurate measure of tissue response at a corresponding point on the surface. Data related to a point in the stitched surface can alternately be averaged such as taking a weighted average of all points used for stitching at the location.

Preserving the association of spatial coordinates with the results of tissue response to light or other stimulus at each intraoral location simplifies the problem of matching and mapping the different types of data obtained to an automatically generated dental chart. Instead of requiring computationally intensive methods for feature detection and alignment of separate data content, the preserved association allows the 3D surface reconstruction and stitching operation to serve as a reference for organizing and displaying the information obtained from multiple imaging modes.

Figure 10B:
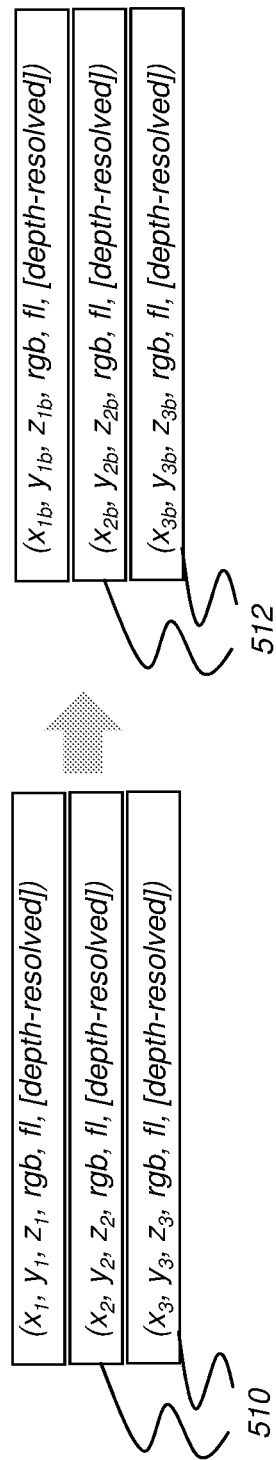
FIG. 10B is a schematic diagram that shows re-mapping of the acquired image content for a set of locations following the stitching transform.

In order to preserve the association of the multimodal image content with its spatial coordinates, the stitching algorithm that is used can transform image coordinates and link the corresponding content to the new coordinates in the transformation. The schematic diagram of FIG. 10B shows re-mapping of the acquired image content for a set of locations following the stitching transform. Acquired association vectors 510 provide structure to the measured data for tissue response for locations shown with corresponding spatial coordinates $(x_1, y_1, z_1)$, $(x_2, y_2, z_2)$, and $(x_3, y_3, z_3)$. Following the stitching process, these initial coordinates are transformed to coordinates of the stitched reconstructed 3D surface, represented in this example as spatial coordinates $(x_{1b}, y_{1b}, z_{1b})$, $(x_{2b}, y_{2b}, z_{2b})$, and $(x_{3b}, y_{3b}, z_{3b})$. The stitching transformation thus brings along with it the corresponding data, maintaining the original correspondence between the multimodal measurements acquired at each particular intraoral location and coordinates assigned to a reconstruction from the acquired images. In this way, the 3D surface reconstruction and stitching maintain the registration of different elements of multimodal data to each other, simplifying analysis and presentation of the multimodal image content.

Processing for OCT Imaging

Figure 11:
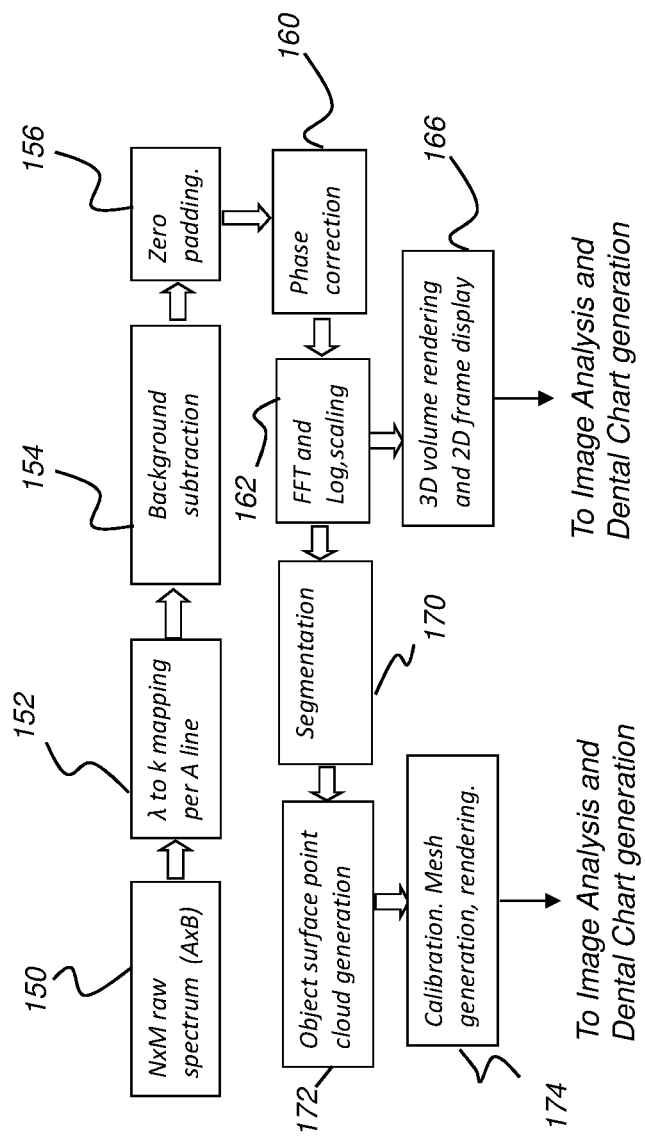
FIG. 11 is a flowchart that shows a method for OCT processing to obtain OCT imaging content along with a surface point cloud extracted from the OCT content according to an example embodiment of the present disclosure.

The flowchart of FIG. 11 shows a method for OCT processing to obtain OCT imaging content along with a surface point cloud extracted from the OCT content according to an example embodiment of the present disclosure. The raw 2D spectral data 150 with numerous A-scans per each B-scan is provided over the range of wavelength $\lambda$ of the light signal, provided as "N" lines with "M" pixels per line. A mapping 152 then provides a wave-number value "k" for each corresponding wavelength $\lambda$. A background subtraction 154 executes, calculated along the B direction for each k value, and a line of background signal is obtained. Background subtraction 154, performed on each A-line, helps to remove fixed pattern noise. In a zero-padding operation 156 and a phase correction process 160, spectrum sampling is corrected and dispersion-induced OCT signal broadening obtained. An FFT processing step 162 provides processing and scaling of the phase-corrected data to provide input for a 3D volume rendering and 2D cross-section frame display rendering 166, useful for visualization and diagnostic support. At the conclusion of step 162, the OCT image content is available.

Subsequent processing in the FIG. 11 method then extracts the point cloud for surface characterization and subsequent matching/stitching. A segmentation step 170 is executed to extract the surface contour data from the OCT volume data. Object surface point cloud generation step 172 provides the surface point clouds of the measured object. Point clouds can then be used for mesh rendering step 174 along with further processing. Geometric distortion calibration of OCT images can be executed in order to help correct shape distortion. Unless properly corrected, distortion can result from the scanning pattern or from the optical arrangement that is used. Distortion processing can use spatial calibration data obtained by using a calibration target of a given geometry. Scanning of the target and obtaining the scanned data establishes a basis for adjusting the registration of scanned data to 3D space, compensating for errors in the scanning system. The calibration target can be a 2D target imaged at one or more positions or a 3D target.

Segmentation step 170, object surface point cloud generation step 172 and mesh generation and rendering step 174 of the FIG. 11 method obtain surface contour data from OCT volume measurements. Importantly, results of these steps are the reconstructed surfaces of the object measured by OCT. When reflectance image data and fluorescence image data are also captured during scanning, the OCT volume, reconstructed 3D surface, 2D reflectance images, and 2D/3D fluorescence images are all linked together, registered to each other, being identified to the same view of sample "S".

The generated 3D surface is stitched together to new 3D surfaces reconstructed from scanned data obtained in new views, using matching methods commonly known in the art, such as iterative closest point (ICP) merging. The stitching process also makes use of the spatial calibration data described above. Successful stitching determines the spatial coordinates of each point on the imaged surfaces and thus obtains the correct spatial relationship between different 3D surfaces. In this way, association of spatial locations of the various types of obtained data are preserved. OCT and the multimodal image data content obtained by the scanner can thus be automatically registered, without requiring additional steps.

The 3D surface data, OCT depth-resolved volume, 2D reflectance images, and 2D/3D fluorescence images can be displayed, stored, or transmitted to another computer or storage device. According to an example embodiment of the present disclosure, these multimodal image data can be used to form and to populate a dental chart, as described in more detail subsequently. Processed results of the FIG. 11 method can be directed to subsequent control logic processing for image and diagnostic analysis for generation of information needed for arranging the dental chart.

Depending on applications and imaging conditions, various image segmentation algorithms can be used in segmentation step 170 of the FIG. 11 method to extract object surfaces. Image segmentation algorithms such as simple direct threshold, active contour level set, watershed, supervised and unsupervised image segmentation, neural network-based image segmentation, spectral embedding and max-flow/min-cut graph-based image segmentation are well known in the image processing fields and can be utilized. They can be applied to the entire reconstructed 3D volume or separately to each 2D frame of the OCT data.

Figure 12B:
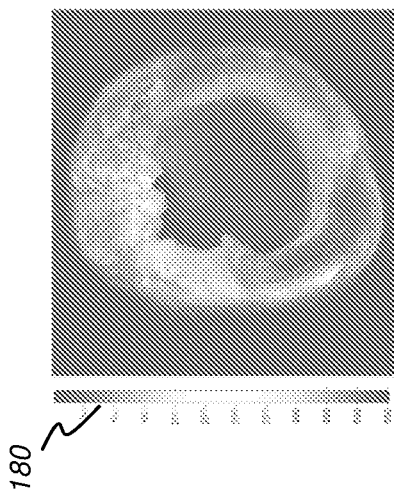
FIGS. 12A-12E show different types of imaging content acquired and generated as part of the OCT processing method, using the example of a tooth image having a severe cavity.
Figure 12E:
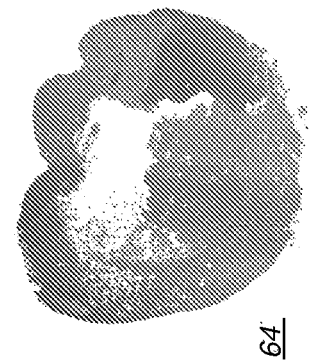
Figure 12A:
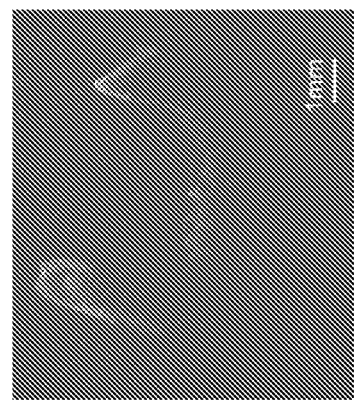
Figure 12D:
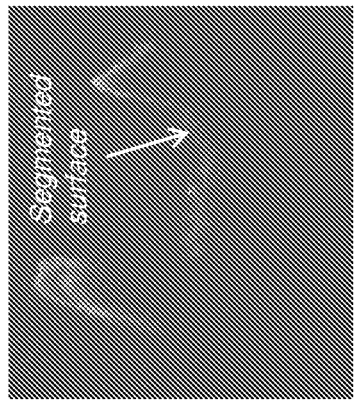
Figure 12C:
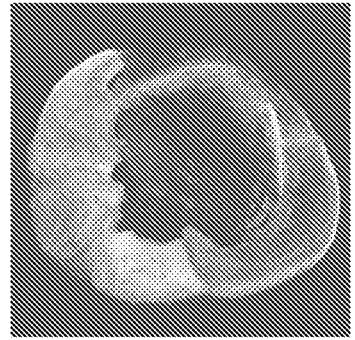

FIGS. 12A-12E show different types of imaging content acquired and generated as part of the OCT processing method, using the example of a tooth image having a severe cavity. FIG. 12A shows a 2D slice that corresponds to a B-scan for OCT imaging. FIG. 12B shows a depth-encoded color projection of the tooth with an optional color bar 180 as a reference. FIG. 12C shows a corresponding slice of the volume rendering obtained from the OCT imaging content. FIG. 12D shows the results of segmentation processing of FIG. 12A in which points along the tooth surface are extracted. FIG. 12E shows a surface point cloud 64 of the tooth generated from the OCT volume data. The surface point cloud 64 can be obtained from the OCT volume data following segmentation, as shown previously with respect to the method of FIG. 11.

Mapping and Analysis of the OCT Data

As shown in the example images of FIGS. 12A-12E, the depth-resolved OCT data that is acquired also supports reconstruction of the surface contour of teeth, gums, and other features of patient dentition and supporting structures. In addition, the depth-resolved data itself is associated or mapped to the reconstructed surface contour. Association of the depth-resolved data with spatial locations on the surface also allows the resulting dental charts that are generated to be spatially associated with analysis or assessment of cavities and other lesions, assessment of the integrity of temporary and permanent fillings, assessment of various prosthetic devices, hardware, and implants. This association can also help to provide indicators of the health of specific areas of the gums and other supporting and nearby tissue.

Surface Contour Imaging using Reflected Light

Unlike OCT imaging described previously, conventional surface contour imaging uses reflectance imaging and provides data for characterizing a surface, such as surface structure, curvature, and contour characteristics, but does not provide information on material that lies below the surface. Contour imaging data or surface contour image data can be obtained from a structured light imaging apparatus or from an imaging apparatus that obtains structure information related to a surface from a sequence of 2D reflectance images obtained using visible light illumination, generally in the wavelength range above about 380 nm and less than a 740 nm threshold, near-infrared light near and extending higher than 740 nm, or ultraviolet light wavelengths below 380 nm. Alternate techniques for contour imaging include structured light imaging as well as other known techniques for characterizing surface structure such as, for example, feature tracking by triangulation, structure-from-motion photogrammetry, time-of-flight imaging, interferometric-based imaging, and depth-from-focus imaging. Contour image content can alternately be extracted from volume image content such as, for example, from the OCT volume content (as described previously with respect to FIG. 11) by identifying and collecting only those voxels that represent surface tissue.

The phrase "patterned light" is used to indicate light that has a predetermined spatial pattern, such that the light has one or more features such as one or more discernable parallel lines, curves, a grid or checkerboard pattern, or other features having areas of light separated by areas without illumination. In the context of the present disclosure, the phrases "patterned light" and "structured light" are considered to be equivalent, both used to identify the light that is projected onto the subject in order to derive contour image data.

In structured light imaging, a pattern of lines or other structured pattern is projected from the imaging apparatus toward the surface of an object from a given angle. The projected pattern from the surface is then viewed from another angle as a contour image, taking advantage of triangulation in order to analyze surface information based on the appearance of contour lines. Phase shifting, in which the projected pattern is incrementally shifted spatially for obtaining additional measurements at the new locations, is typically applied as part of structured light imaging, used in order to complete the contour mapping of the surface and to increase overall resolution in the contour image.

Multimodal imaging devices of the present invention may include depth-resolved imaging or conventional surface contour imaging. For example, the TRIOS® dental intraoral scanner from 3Shape, Copenhagen, Denmark performs surface contour imaging using depth-from-focus technique and captures color reflectance images and tooth shades during scanning. The CEREC™ Omnicam™ system from Dentsply Sirona, Salzburg, Austria performs surface contour imaging using structured light triangulation technique and captures color reflectance images and tooth shades during scanning. International Patent Application No. US 2014/070719 entitled "Intra-Oral 3-D Fluorescence Imaging" by Inglese et al. captures 3D surface contours using structured light triangulation, color reflectance images, and 2D/3D fluorescence images.

3D Arch Surface Reconstruction

Reconstruction of the 3D mesh corresponding to a full arch is typically done by acquiring a series of slightly overlapping intraoral 3D surface views and stitching them together. The process of identifying over which portion of the mesh under construction the newly acquired view overlaps is referred to as "matching" or "stitching". Employing matching methods familiar to those in the surface contour imaging arts, an intraoral 3D scanner can generate a 3D mesh of an entire arch of a patient as the separate views are acquired.

As was described previously with reference to FIG. 11, multiple OCT measurements can alternately be used for 3D surface reconstruction, following the same stitching process described above. The OCT data from successive scans is processed to identify surface content. With respect to the description related to FIGS. 5A and 5B, the surface features are readily provided by identifying the outermost A-scan data for each B- and C-scan position.

Generating and Populating the Dental Chart

According to an example embodiment of the present disclosure, the image content from any of the available imaging modes can be spatially associated with the surface reconstruction that is generated following a scan. For any of the image data obtained in a scan, spatial locations are automatically determined as a result of successful stitching. The surface reconstruction that is generated preserves the association of spatial coordinates with the image data that shows the response of tissue in the various modes. Thus, for example, a given coordinate of the surface reconstruction can be associated with a particular reflectance imaging value such as an R, G, B value, with a shade, with a fluorescence value, and with OCT depth imaging content. Combined information for multiple imaging modes can thus be associated with coordinate space without the need for separate calibration, alignment, or matching logic.

For example, the reflectance image content and OCT scan content for a particular intraoral surface location can be associated with a location on the 3D arch surface reconstruction. This reconstruction can then be used for forming and populating a dental chart, preserving the spatial coordinate information related to each corresponding area of the dental chart.

Figure 13:
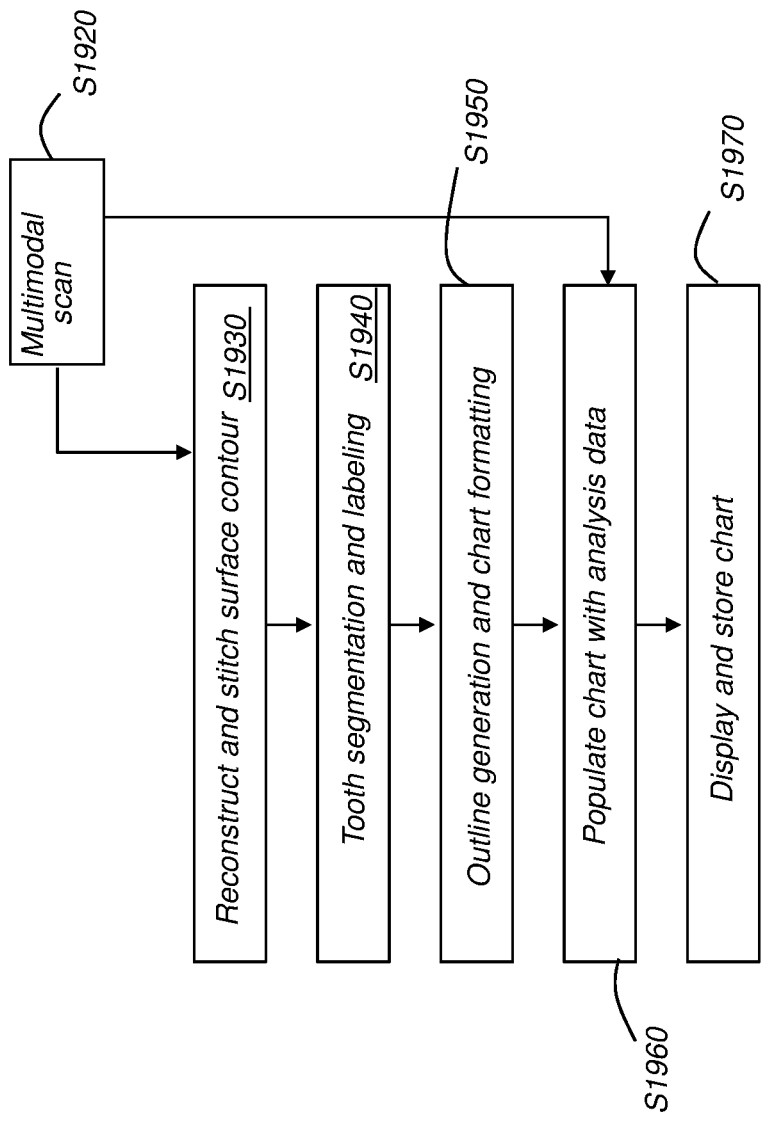
FIG. 13 is a flowchart that shows a method for generating a dental chart using multimodal scan image data according to an embodiment of the present invention.

The flowchart of FIG. 13 shows a method for generating a dental chart according to scanned data from a scanner device capable of capturing multimodal image content, such as reflectance imaging, OCT scanning, and fluorescence imaging. A scanning step S1920 acquires 3D contour data and other multimodal image data content. A reconstruction and stitching step S1930 then reconstructs a 3D surface contour using a subset of the scanned data. As part of step S1930, the reconstruction and stitching operation obtains the spatial coordinate information related to image content from multimodal imaging.

Continuing with the FIG. 13 method, a segmentation step S1940 then performs tooth segmentation and labeling, based on spatial relationships of the surface points obtained in step S1930 and using utilities and approaches familiar to those skilled in the image reconstruction arts. An outline generation step S1950 generates outline data suitable for dental chart construction such as, for example, providing line art for side and top views. An analysis step S1960 then analyzes the scan data for the teeth and associated gum structures and associates the analysis with elements of the dental chart. A display step S1970 presents the generated dental chart for viewing on a display and, alternately, stores the chart for future reference or for transmitting or communicating to another computing device or data storage unit.

The generated chart can be updated using subsequent scan data from the same multimodal scanner device. Because the internal spatial reference of the scanner is unchanged, the reconstructed 3D surface from the newly scanned data can be stitched to the existing dentition, thereby establishing spatial locations of the new multimodal image data. The existing and updated analysis results at any part of the tooth can be easily compared to bring attention to changing conditions such as, for example, presence of fillings (e.g., amalgam, composite) or prosthesis (e.g., crown, bridge, veneer, denture), absence of tooth, onset of caries, development of cracks, recession of gum line, and erosion of enamel.

Because it acquires some amount of depth data, depth-resolved imaging data (such as, for example, OCT scan data or alternately ultrasound or photoacoustic data) includes information that can be used for analysis of the condition of teeth and gums. Ultrasound images are useful for detecting periodontal pocket depths. The reflectance image content can provide accurate information on tooth contour and overall geometry, as well as detailed surface features for teeth, gums, and other structures. Fluorescence image content is useful for detecting caries, mineralization state, plaque, and prosthetic materials on the tooth. Each type of information can be used to populate the dental chart that is generated, allowing ready reference to detailed data about specific features of patient dentition.

Presentation of detailed information can take various forms. According to an example embodiment of the present disclosure, various types of information can be selectively enabled or hidden from view as desired by the practitioner. This can help to reduce confusion, while still allowing association and storage of significant information accessible from the dental chart. A layered model can be adapted so that more specialized information of a particular type is presented as an "overlay". Thus, for example, information on gum condition can be separately enabled from information on teeth such as cavities, fillings, implants, or other features.

In addition to generating dental charts in standard view formats, an example embodiment of the present disclosure can provide some degree of manipulation of standard views, for example, allowing perspective views. Cross-sectional views (for example, corresponding to OCT B-scans as described previously) can be viewed at locations of interest. A progressive sequence of views can alternately be presented so that the view angle is adjusted based on cursor position. Coordinate locations can also be displayed for various features, allowing the conventional "flattened", 2-D dental chart to include annotation that is descriptive of the actual position of a tooth or other feature.

Figure 14A:
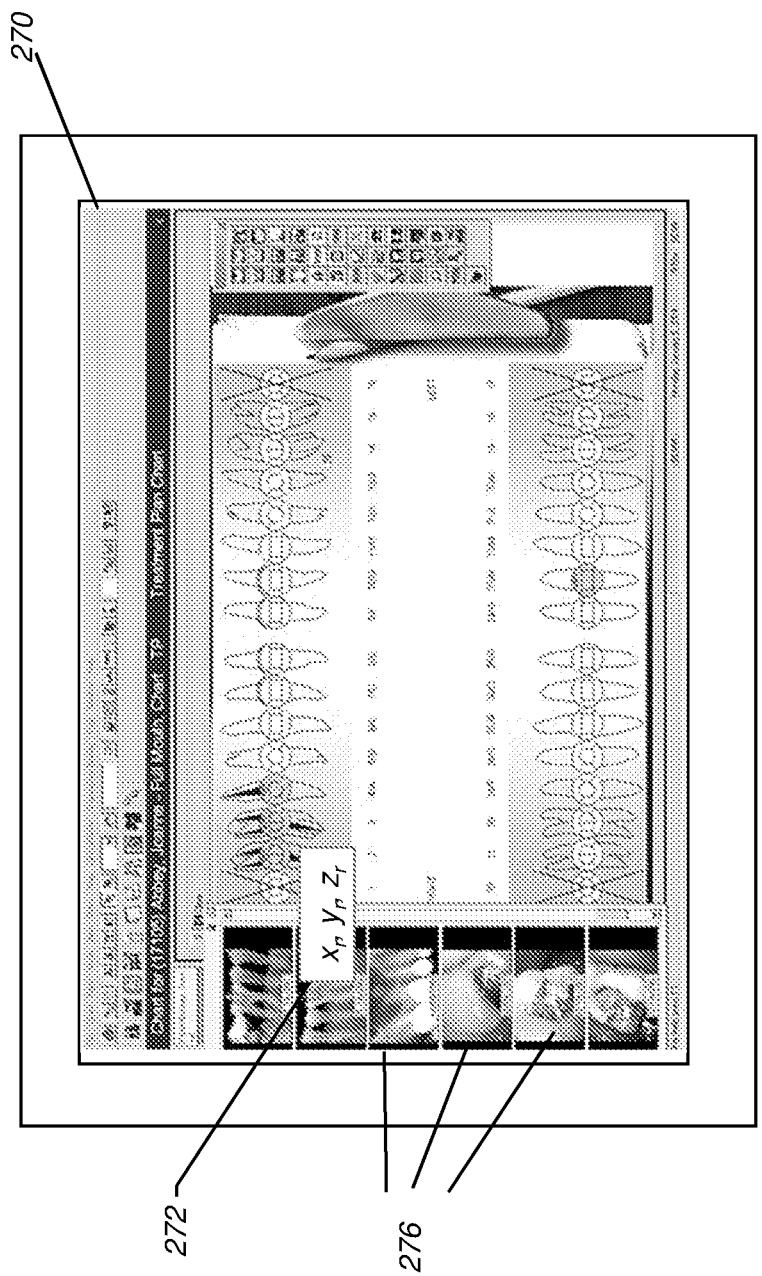
FIGS. 14A, 14B, and 14C show various aspects of a dental chart generated and displayed according to an example embodiment of the present invention.
Figure 14B:
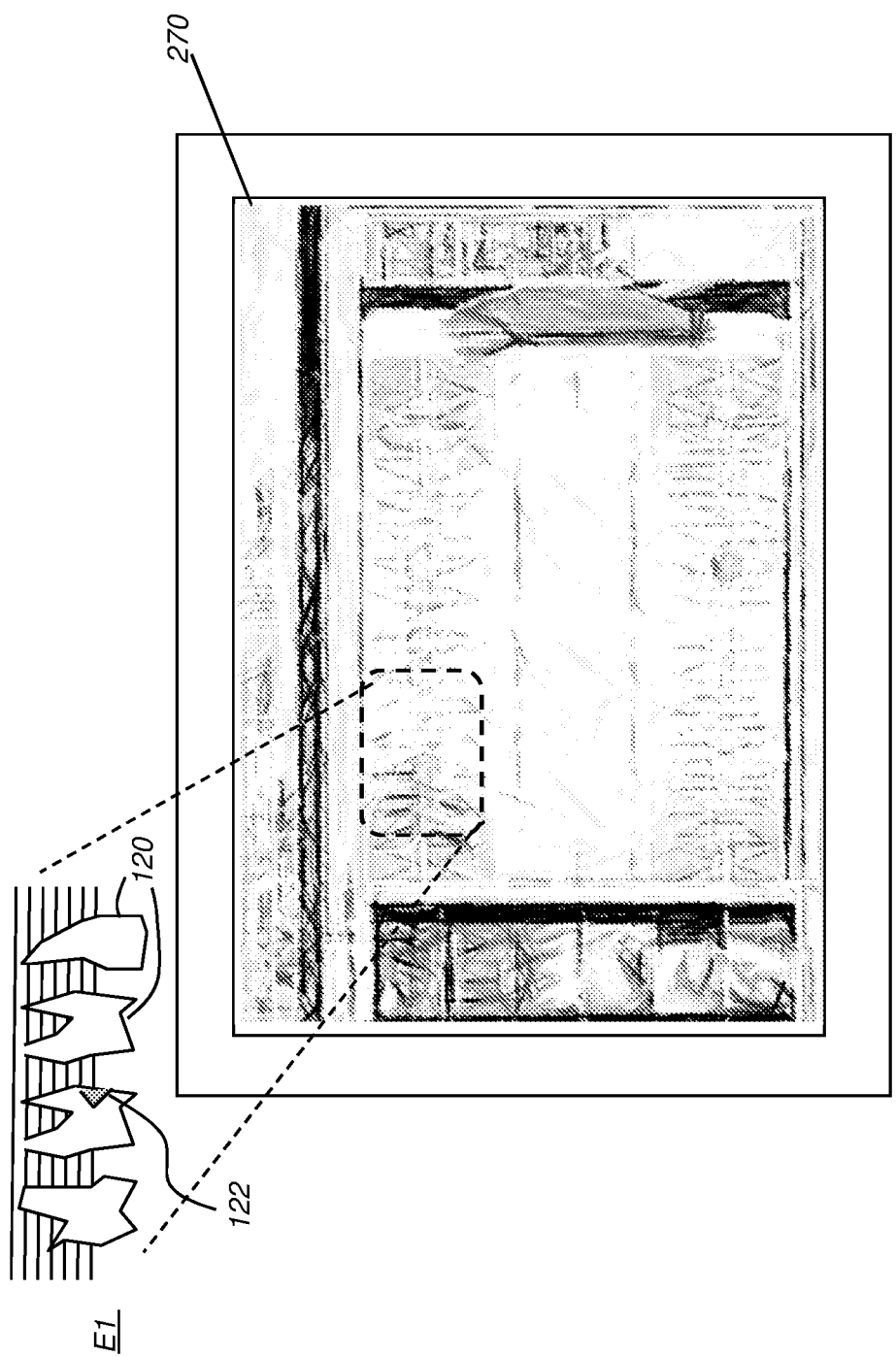
Figure 14C:
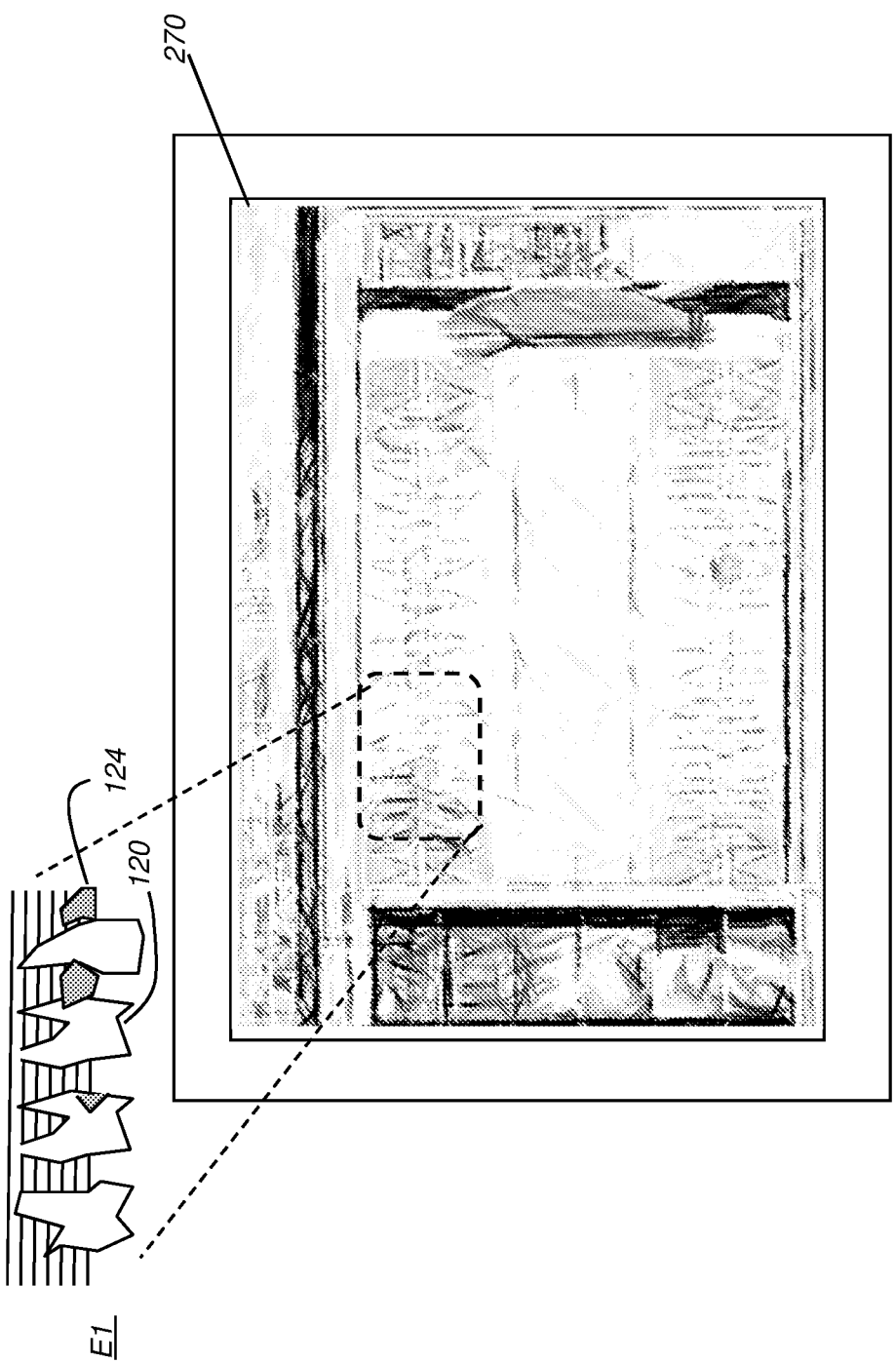

FIGS. 14A, 14B, and 14C show various aspects of a dental chart generated and displayed according to an example embodiment of the present invention. In FIG. 14A, a displayed dental chart 270 is shown. Individual entries in dental chart 270 can be linked to surface contour images 276, shown in low-resolution or thumbnail form in FIG. 14A. Coordinate references 272 obtained as part of the scan can be provided on the display. Features such as hovering using a mouse or other pointer can provide both coordinate reference data and any associated image content that relates to an indicated location.

By way of example, FIG. 14B shows an enlarged area E1 of the dental chart 270, schematically showing a few teeth 120. Related information for one of the teeth 120 includes an area of suspected caries 122. FIG. 14C includes additional information, highlighting a nearby portion of the gum tissue 124 that may be bleeding or show other conditions. Display for various detected conditions of teeth and gums can be separately enabled or disabled, as described previously, allowing the practitioner to focus on particular conditions of interest or concern.

Figure 14D:
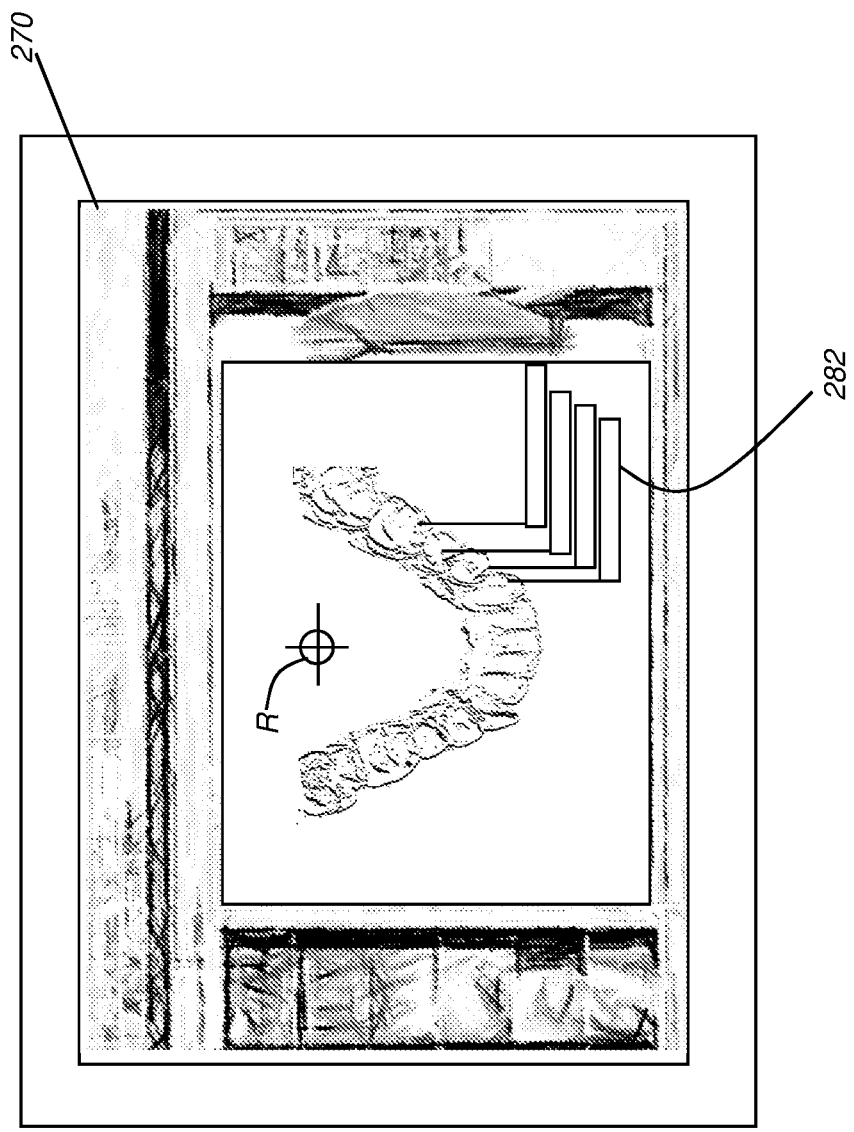
FIG. 14D shows an example of a generated dental chart with a top view of the patient's dentition.

FIG. 14D shows an example of a generated dental chart 270 with a top view of the patient's dentition.

Figure 14E:
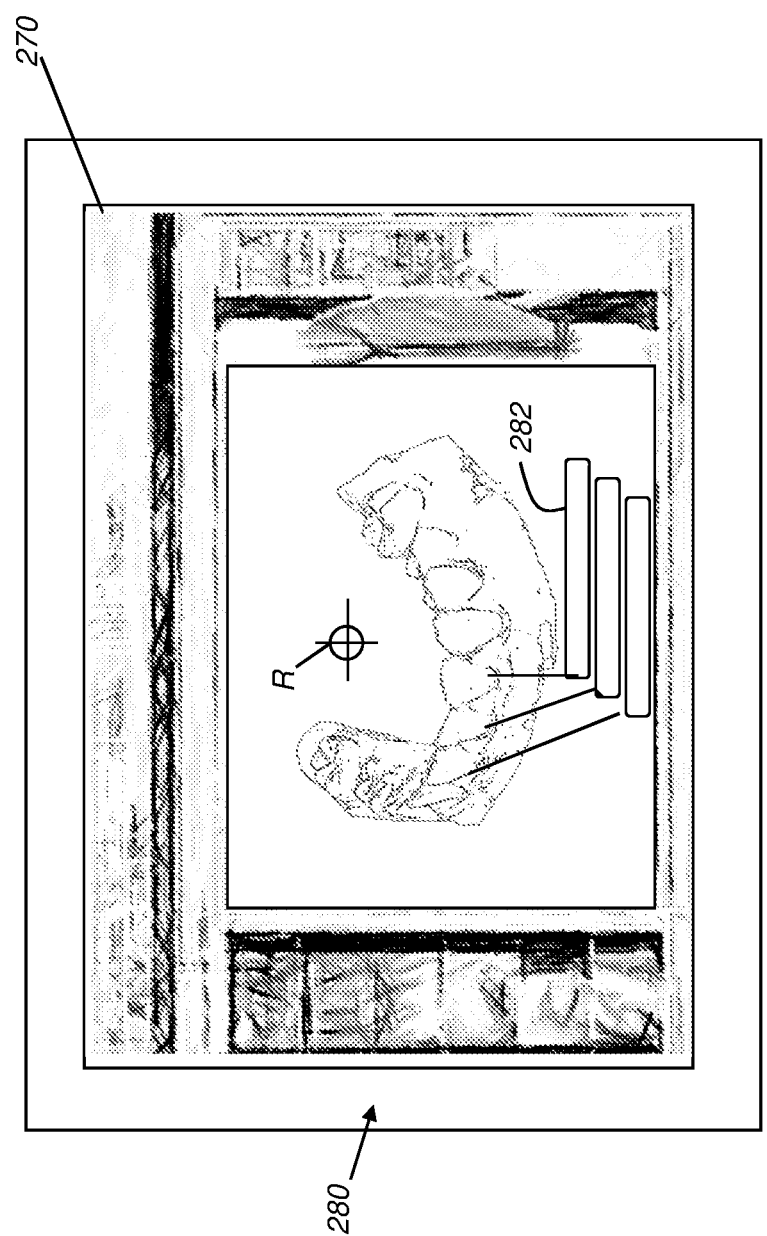
FIG. 14E shows an example of a generated dental chart with a perspective view of the patient's dentition.

FIG. 14E shows an example of a generated dental chart 270 with a perspective view of the patient's dentition. As shown in FIGS. 14D and 14E, a reference origin "R" can be displayed, providing a reference datum for the spatial coordinate associations that are preserved in the reconstruction. A number of thumbnail images 280 can be provided to show the various types of information available for a selected tooth or gum area.

According to an example embodiment of the present disclosure, the graphical arrangement of dental chart data that has been automatically generated can be displayed in a standard dental chart format familiar to the practitioner or in a 3D format or other format using tooth outline generated according to the procedures described above. A toggle or other command can be provided in order to select the display format preferred by the practitioner according to an entered operator instruction. Display format options can include the flat, 2D alignment of the traditional dental chart as shown in the example of FIG. 14A, the flat 2D plan view or top view from a standard chart or from the patient image as shown in the FIG. 14D example, or the perspective 3D view of the upper or lower jaw as shown in FIG. 14E. Pan, zoom and 3D rotation for individual teeth, for sets of teeth, or for the jaw structure can be displayed using various dental chart representations shown in the examples of FIGS. 14A-14E. The position of origin "R" can be adjusted, with corresponding changes made to other coordinates of the populated dental chart.

Various dental chart arrangements can be displayed. For example, the conventional dental chart arrangement shown in FIGS. 14A-14C can be most preferred by experienced practitioners, who may find this configuration most readily usable and can take advantage of added features that allow viewing different types of information available from the populated dental chart. The alternative views of FIGS. 14D and 14E can be valuable for viewing specific information about the spatial arrangement of the teeth and may be more useful in assessing how the teeth are disposed with respect to each other within the jaw. Annotation can be provided for different dental chart embodiments, allowing the practitioner and staff, for example, to record various data during examination or cleaning. FIG. 14D shows an arrangement of annotations 282 that can be displayed showing, for example, practitioner observations or showing details detected in an automated analysis of tooth condition. Labeling, such as with a tooth number, can be provided and can track tooth position, following the displayed content such as when a 3D view of the dentition is rotated or during zoom or pan operations.

Figure 15:
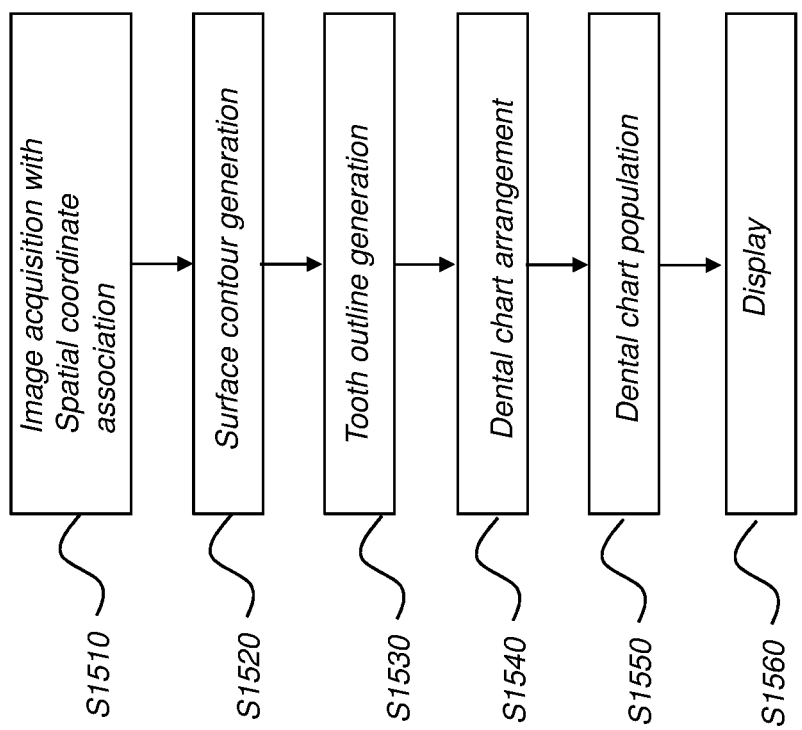
FIG. 15 is a flowchart that shows a method of steps for automating the process of dental chart preparation according to an example embodiment of the present disclosure.

The flowchart of FIG. 15 shows a method including steps that can be executed for automating the process of dental chart preparation using acquired multimodal image data according to an example embodiment of the present disclosure. Multimodal image content is obtained in an acquisition step S1510. The multimodal image content can be acquired by using a single imaging signal, such as a visible light source that has the spectral bandwidth to provide both reflectance imaging content and fluorescence. Spatial coordinates are retained with the image acquisition and provide a mechanism for automatic association of image content originating from multiple imaging modes. Alternately, acquisition step S1510 can use multiple output imaging signals such as employing light signals of different bandwidths acquired simultaneously or in close sequence, directed along a common axis. In a surface contour generation step S1520, control logic in the intraoral probe generates a surface contour using the acquired multimodal image content. Stitching logic is used to join adjacent images, again preserving the association of spatial coordinates for the multimodal image content. A tooth outline generation step S1530 then executes and in which probe logic can generate tooth outlines for use in the dental chart. Dental chart setup step S1540 can then assemble the dental chart using the sequence of tooth outlines obtained in step S1530 to show a spatial ordering of teeth as well as supporting gum tissue adjacent to the teeth. Each assembled element of the dental chart can then be associated with corresponding multimodal image content in a dental chart population step S1550. Step S1550 analyzes the multimodal image content and associates results of this analysis with positions and features of the assembled dental chart. A display step S1560 then renders the dental chart to a display, as well as generating any necessary data file for storage, transmission, or communication of the populated dental chart to other systems.

In addition to image content acquired using an intraoral imaging device, example embodiments of the present disclosure can also use, as multimodal image content, image data obtained from extraoral imaging apparatus such as bite-wing and periapical dental x-ray or cone beam computed tomography (CBCT) systems. Imaging modes using radiation can be associated with spatial coordinates for the intraoral image content using various utilities for feature recognition. For example, the volume image obtained using CBCT processing can be registered to the surface contour or surface mesh obtained by the intraoral imaging apparatus using volume image registration methods commonly known in the art. X-ray and CBCT image content can thus be correlated to the dental chart for ready reference and display.

Advantageously, spatial correlation of image content from multiple imaging modes can be readily achieved using an example embodiment of the present disclosure. No processing delay is needed for separate registration processing for image content that is obtained from the scanner 314 (FIG. 1). Coordinates of the surface reconstruction can be associated with a particular reflectance imaging value such as with an R, G, B value, with a shade, with a fluorescence value, and with OCT depth imaging content, as well as with x-ray and CBCT image content. Combined information for multiple imaging modes can thus inventively be associated with intraoral coordinate space without the need for separate calibration, alignment, or matching logic and the processing overhead required to achieve registration for image data of different types related to patient dentition.

Update Utilities and Workflow

The capability for straightforward spatial association of image data of different modes provides a number of options and features useful for improving the update process. As noted previously, it can be helpful to image a single tooth or a small portion of the jaw during treatment such as periodically during various stages of implant preparation or in order to track ongoing progress of a suspected caries condition, using the same or another calibrated multimodal intraoral scanner. Example embodiments of the present disclosure support update in a number of ways, including the following:

(i) Dental chart generation and update options. As one option, the practitioner can choose to generate a new dental chart, such as with a full scan of intraoral surfaces and a repetition of the chart generation processing described hereinabove. By default, the previously acquired dental chart and associated image content can be stored or archived to maintain historical data for the patient when the new chart is generated. Alternately, the practitioner can opt to update the existing chart with new information specific to one or more teeth or intervening tissue areas or with new image content relative to specific imaging modes. This type of partial update requires that the new surface reconstruction be stitched to the surfaces of the existing dentition, thereby allowing the new content that is associated with the new surface reconstruction be mapped to coordinates of the existing dental chart. Techniques to support stitching of the newly reconstructed surface to the existing reconstructed surface are familiar to those skilled in the imaging arts. The dental chart update option can be fully automated or may benefit from some measure of operator input, such as a touch screen, mouse, or keyboard entry that coarsely identifies the tooth location being probed and scanned by the operator.

Figure 16:
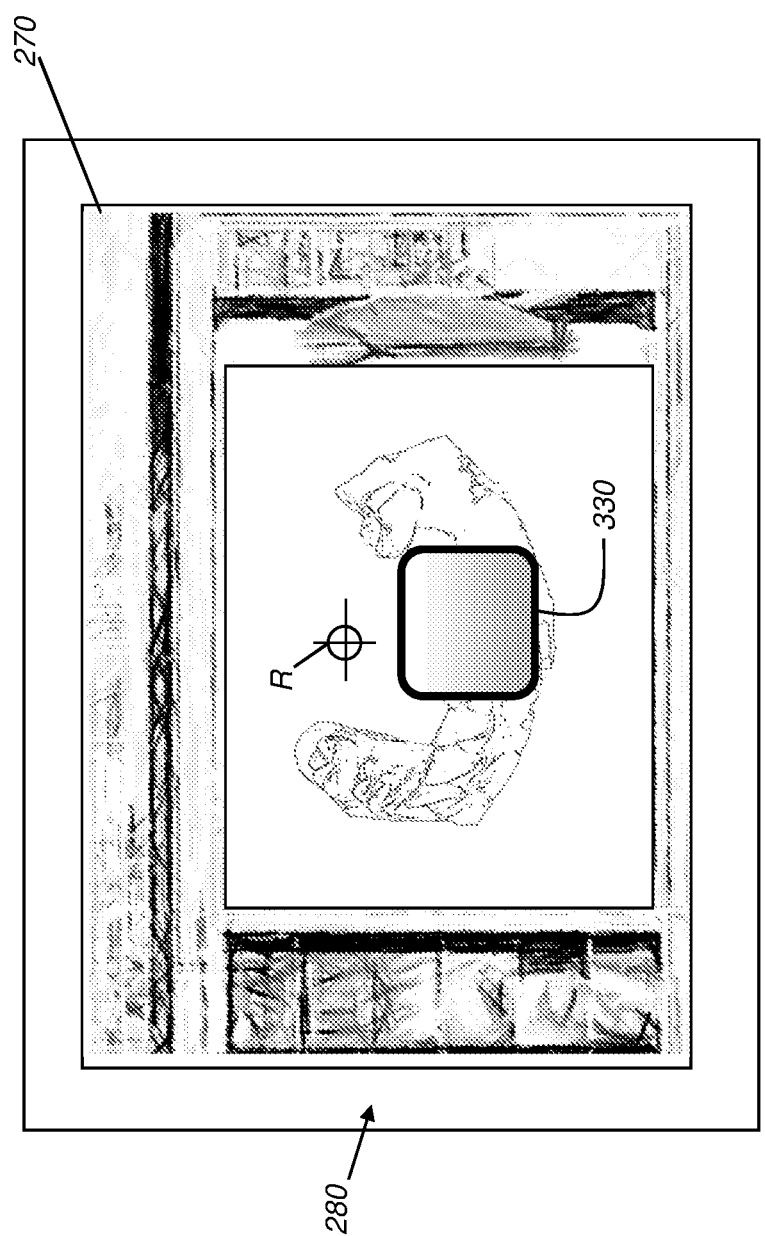
FIG. 16 is a schematic diagram that shows an example of highlighting positioned on a perspective view of a dental chart and showing the current position of a scanner or probe relative to the overall patient dentition for acquiring image content.

(ii) Localized highlighting relative to the update position and/or content. As noted previously, the practitioner can have the capability to select a display format for the dental chart, such as showing the conventional 2D array view (FIGS. 14A-C), a plan view or top schematic view (FIG. 14D), or a perspective 3D view (FIG. 14E). To support update scanning operation with the intraoral probe or scanner 314 (FIG. 1), any of a number of highlighting schemes can be selected. FIG. 16 shows highlighting 330 positioned on a perspective view of the dental chart and showing the current position of scanner 314, relative to the overall patient dentition, for the newly acquired image content. This type of visual operator feedback can be helpful to the practitioner or technician for assurance that the proper area for update is being imaged. Other types of highlighting can help to indicate various imaging modes for which data is acquired. Color-coding can be used to indicate which type of image content is available or is currently being updated such as, for example, orange for OCT image content and green for fluorescent content. Color or other highlighting method can also be used to indicate processing status. Boundary coordinates for relating the scanned area to the overall dental chart and origin "R" can also be displayed if useful to the technician or practitioner.

Figure 17:
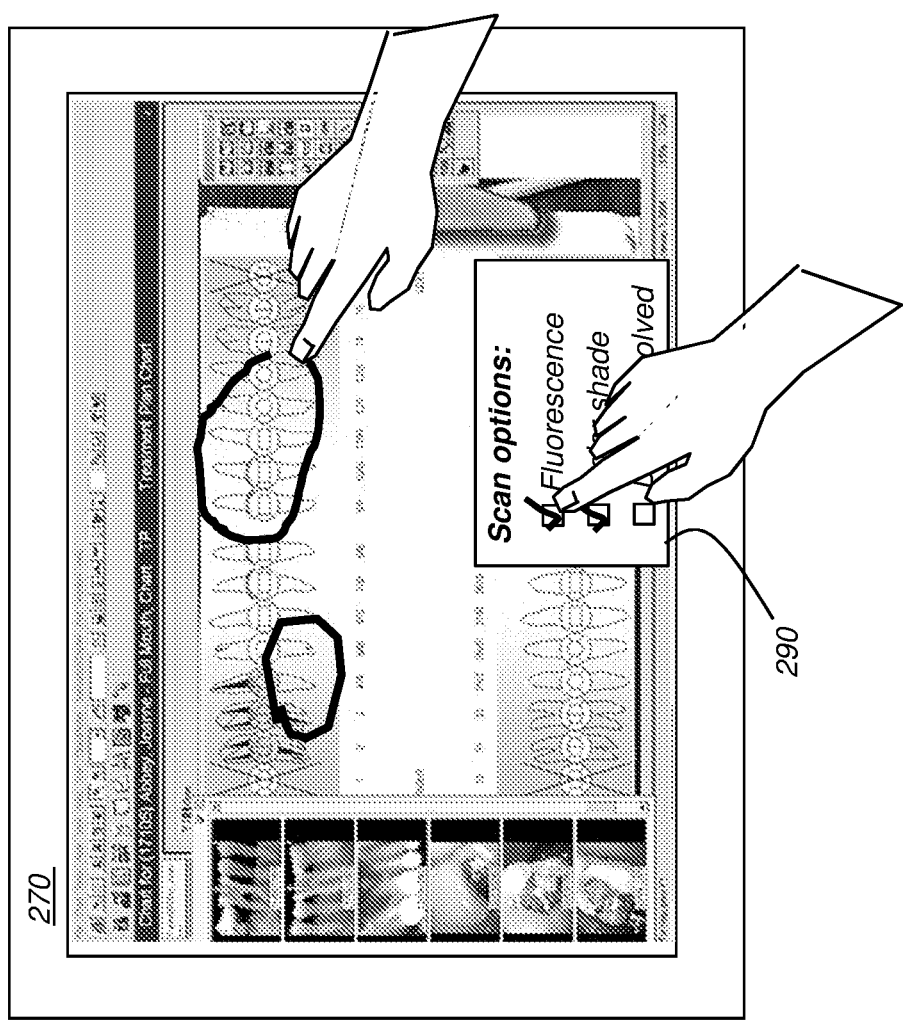
FIG. 17 is a schematic diagram that shows example entries of touchscreen instructions for identifying particular teeth or other features.

(iii) Chart-guided update. According to an example embodiment, markup utilities are provided for identifying areas needing image content update by entries made on the dental chart. Using this scheme, the electronically generated, populated dental chart can be a useful tool for improved communication and for advancing workflow for the dental treatment team. For example, a practitioner may want updated image content for teeth numbers 8-11 and for gum tissue between teeth numbers 2 and 5. The practitioner can electronically mark the dental chart by entering operator instructions such as by using a mouse or touchscreen entry. The schematic diagram of FIG. 17 shows example entries of touchscreen instructions that identify particular teeth or other features such as by using simple outlining as shown. A popup menu 290 can provide selections that allow the practitioner to specify imaging modes for scan information to be acquired. Using the same or another calibrated multimodal intraoral scanner, the update process can be carried out without other detailed positioning sequence. The technician can operate the probe or scanner 314, scanning over the teeth of interest and can receive on-screen or audible operator feedback indicating that some or all requested information from the practitioner entries has been obtained and updated. This sequence simplifies the acquisition and processing of information without requiring written or verbal instructions and consequent risk of confusion.

(iv) Time-lapse display using stored "historical" content for one or more modes. As part of the update process, previously stored image content of one or more imaging modes can be retained for future analysis and presentation. Thus, for example, progression of a caries condition at one or more teeth over time can be readily observed and displayed in fluorescence 2D images or OCT cross-sectional (B-scan) images, with the successively stored image content in registration and rendered to the display in time sequence, following the familiar model of a time-lapse video. Time information related to each stored image can also be displayed as an aid to tracking progress and rate for a condition. A selection button or other instruction entry tool on the populated dental chart enables selection and "playback" of previously stored views and includes the capability for specifying the particular modes of image content that display.

The invention has been described in detail with particular reference to presently understood example embodiments, but it should be appreciated and understood that variations and modifications can be affected within the spirit and scope of the invention.

For example, control logic processor 340 can be any of a number of types of logic processing device including, without limitation, a computer or computer workstation, a dedicated host processor, a microprocessor, a digital signal processor, logic array, or other device that executes stored program logic instructions.

The presently disclosed example embodiments are, therefore, considered in all respects to be illustrative and not restrictive. The scope of the invention is indicated by the appended claims, and all changes that come within the meaning and range of equivalents thereof are intended to be embraced therein.

Consistent with at least one example embodiment, example methods/apparatus can use a computer program with stored instructions that operate on image data that is accessed from an electronic memory. As can be appreciated by those skilled in the image processing arts, a computer program of an example embodiment herein can be utilized by a suitable, general-purpose computer system such as a personal computer or workstation. However, many other types of computer systems can be used to execute the computer program of described example embodiments including, for example, an arrangement of one or networked processors.

A computer program for performing methods of certain example embodiments described herein may be stored in a computer readable storage medium. This medium may comprise, for example and not limitation: magnetic storage media such as a magnetic disk, a hard drive, or removable device or magnetic tape; optical storage media such as an optical disc, optical tape, or machine readable optical encoding; solid state electronic storage devices such as random access memory (RAM) or read only memory (ROM); or, any other physical device or medium employed to store a computer program. Computer programs for performing example methods of described embodiments may also be stored on computer readable storage medium that is connected to the image processor by way of the Internet or other network or communication medium. Those skilled in the art will further readily recognize that the equivalent of such a computer program product may also be constructed in hardware.

It should be noted that the term "memory" is equivalent to "computer-accessible memory" in the context of the present disclosure, and can refer to any type of temporary or more enduring data storage workspace used for storing and operating upon image data and accessible to a computer system including, for example, a database. The memory could be non-volatile using, for example, a long-term storage medium such as magnetic or optical storage. Alternately, the memory could be of a more volatile nature using an electronic circuit such as random-access memory (RAM) that is used as a temporary buffer or workspace by a microprocessor or other control logic processor device. Display data, for example, is typically stored in a temporary storage buffer that can be directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It should be appreciated and understood that computer program products for example embodiments herein may make use of various image manipulation algorithms and/or processes that are well known. It should be further appreciated and understood that example computer program product embodiments herein may embody algorithms and/or processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the application, are not specifically shown or described herein and may be selected from such algorithms, systems, hardware, components and elements known in the art.

Example embodiments according to the present disclosure can include various features described herein individually or in combination.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations/example embodiments, such feature can be combined with one or more other features of the other implementations/example embodiments as can be desired and advantageous for any given or particular function. The term "a" or "at least one of" is used to mean one or more of the listed items can be selected. The term "about" indicates that the value listed can be somewhat altered, as long as the alteration does not result in nonconformance of the process or structure to the illustrated example embodiment. Other embodiments of the invention may become apparent to those skilled in the art from consideration of the specification and practice of the invention disclosed herein. It is intended that the specification and examples be considered as examples only, with a true scope and spirit of the invention being indicated by the following claims.

What is claimed is:

1. A method for intraoral imaging, the method comprising the steps of:
    (a) generating one or more output imaging signals from an intraoral probe;
    (b) acquiring multimodal image content from each of a plurality of intraoral surface locations for a patient's dentition according to tissue response from the one or more output imaging signals and associating spatial coordinates to the multimodal image content;
    (c) generating a stitched surface contour of the patient's dentition by reconstructing and stitching from a data subset of the multimodal image content, and preserving an association of spatial coordinates of the multimodal image content to the stitched surface contour;
    (d) generating tooth outlines for one or more teeth from the stitched surface contour and arranging the tooth outlines as a dental chart representing a spatial ordering of the one or more teeth and of supporting gum tissue adjacent to the one or more teeth;
    (e) populating the dental chart by analyzing the multimodal image content and indicating analysis results at one or more positions on the dental chart according to the association of spatial coordinates; and
    (f) displaying the dental chart.

2. The method of claim 1, wherein acquiring the multimodal image content comprises directing the one or more output imaging signals along a common imaging path.

3. The method of claim 1, further comprising updating the dental chart, at least in part, by:
    (i) acquiring updated multimodal image content from one or more intraoral surface locations;
    (ii) reconstructing updated surface views from a data subset of the updated multimodal image content;
    (iii) stitching the reconstructed updated surface views to the stitched surface contour of the patient's dentition; and
    (iv) mapping the updated multimodal image content to the spatial coordinates according to the dental chart.

4. The method of claim 3, further comprising highlighting a location of the updated multimodal image content on the dental chart.

5. The method of claim 4, wherein the highlighting is color-coded according to a mode of the updated multimodal image content.

6. The method of claim 1, further comprising indicating a relative position of the intraoral probe with respect to the patient's dentition on the dental chart.

7. The method of claim 1, wherein displaying the dental chart indicates a status for acquisition or processing of one or more modes of image content.

8. The method of claim 1, wherein displaying the dental chart further comprises presenting a 2D view or a 3D view.

9. The method of claim 1, wherein displaying the dental chart further comprises displaying partial analysis results for one or more imaging modes.

10. The method of claim 1, further comprising storing multimodal image content from successive imaging sessions, and rendering successive versions of the multimodal image content.

11. The method of claim 1, further comprising updating the dental chart by:
    (i) receiving operator input identifying one or more intraoral surface locations requiring updated multimodal image content;
    (ii) acquiring the updated multimodal image content from the one or more intraoral surface locations;
    (iii) mapping the updated multimodal image content to spatial coordinates according to the dental chart; and
    (iv) highlighting locations of the updated multimodal image content on the dental chart.

12. The method of claim 11, further comprising providing visual or audible operator feedback on acquisition status.

13. The method of claim 1, wherein the one or more output imaging signals differ from each other in at least one of wavelength range, wavelength sequence, bandwidth, or coherence.

14. The method of claim 1, wherein a first output imaging signal comprises color light, from three or more primary colors.

15. The method of claim 1, wherein a first output imaging signal comprises a swept source laser.

16. The method of claim 1, wherein the tissue response to a first output imaging signal includes fluorescence.

17. A method for intraoral imaging, comprising:
    (a) generating a plurality of output imaging signals from an intraoral probe, wherein the plurality of output imaging signals are directed along a common axis and wherein the plurality of output imaging signals differ from each other in at least one of wavelength range, wavelength sequence, bandwidth, or coherence length;
    (b) acquiring multimodal image content from each of a plurality of intraoral surface locations for a patient's dentition according to tissue response to the plurality of output imaging signals and associating spatial coordinates to the multimodal image content;
    (c) generating a stitched surface contour of the patient's dentition by reconstructing and stitching from a data subset of the multimodal image content, and preserving an association of spatial coordinates of the multimodal image content to the stitched surface contour;
    (d) generating tooth outlines for one or more teeth from the stitched surface contour and arranging the tooth outlines as a dental chart representing a spatial ordering of the one or more teeth according to the association of the spatial coordinates;
    (e) populating the dental chart by analyzing the multimodal image content and associating results of the analyzing to positions on the dental chart according to the association of spatial coordinates; and
    (f) displaying the dental chart.

18. The method of claim 17, wherein displaying the dental chart comprises displaying a spatial coordinate for an intraoral feature.

19. The method of claim 17, wherein the plurality of output imaging signals comprises a coherent laser beam.

20. The method of claim 19, wherein the coherent laser beam repeatedly changes in wavelength.

21. The method of claim 17, wherein the plurality of output imaging signals comprises an ultrasound signal.

22. The method of claim 17, wherein populating the dental chart comprises associating image content of two or more different imaging modes to a tooth on the dental chart.

23. A method for intraoral imaging, comprising:
    (a) obtaining multimodal image content at each of a plurality of intraoral surface locations from an intraoral probe that is configured to sequentially:
        (i) direct polychromatic visible illumination to each of the plurality of intraoral surface locations and acquire surface image content associated with each of the plurality of intraoral surface locations from reflected polychromatic light; and
(ii) direct a surface contour imaging signal to each of the plurality of intraoral surface locations;
(b) reconstructing a surface contour from the multimodal image content, wherein the reconstruction preserves a spatial association of the surface image content and the surface contour;
(c) generating tooth outlines for one or more teeth from the surface contour and arranging the tooth outlines as a dental chart representing a spatial ordering of the one or more teeth and of supporting gum tissue adjacent to the one or more teeth;
(d) analyzing the multimodal image content;
(e) populating the dental chart by associating analysis results to positions on the dental chart; and
(f) displaying the dental chart.

24. The method of claim 23, wherein populating the dental chart comprises highlighting one or more portions of the analysis results.

25. The method of claim 24, wherein the surface image content comprises a color image.

26. The method of claim 23, wherein populating the dental chart comprises highlighting the tooth outlines using color or shading according to the analysis results.

27. The method of claim 23, further comprising storing, transmitting, or communicating the dental chart.

28. The method of claim 23, further comprising:
directing an excitation illumination of an excitation wavelength range to each of the plurality of intraoral surface locations, and
acquiring fluorescent light image content associated with each of the plurality of intraoral surface locations, wherein fluorescent wavelengths of the fluorescent light image content lie outside the excitation wavelength range, and wherein reconstructing further preserves the spatial association of the surface image content with the fluorescent light image content and the surface contour.

29. The method of claim 28, wherein the excitation illumination is provided from a light source that is also used for directing the polychromatic visible illumination.

30. The method of claim 23, wherein the surface contour imaging signal acquires depth-resolved image content.

31. A method for intraoral imaging, comprising:
(a) obtaining multimodal image content at each of a plurality of surface locations within a patient's dentition from an intraoral probe that is configured to sequentially:
(i) direct polychromatic visible illumination to each of the plurality of surface locations and acquire 2D image content associated with each of the plurality of surface locations from reflected polychromatic light; and
(ii) direct a point-by-point scan sequence of coherent light beams that penetrate points at each of the plurality of surface locations, modulating a wavelength of the coherent light beams at each penetrated point over a wavelength range, to acquire an interference signal having depth-resolved image content;
wherein the polychromatic visible illumination and sequence of coherent light beams are directed along a common optical axis of the intraoral probe;
(b) reconstructing a surface contour of the patient's dentition from the multimodal image content, wherein the reconstruction preserves an association of the 2D image content and the depth-resolved image content with each of the plurality of surface locations;
(c) generating tooth outlines for one or more teeth from the surface contour and arranging the tooth outlines as a dental chart representing a spatial ordering of the one or more teeth and of supporting gum tissue adjacent to the one or more teeth;
(d) analyzing the multimodal image content and populating the dental chart by associating analysis results to positions on the dental chart; and
(e) displaying the dental chart.

32. An intraoral probe, comprising:
(a) signal generation circuitry within a body of the intraoral probe for generating one or more output imaging signals;
(b) one or more imaging sensors within the body of the intraoral probe for generating multimodal image content from each of a plurality of intraoral surface locations for a patient's dentition according to detected tissue response to the one or more output imaging signals;
(c) a control logic processor in signal communication with the signal generation circuitry and with the one or more imaging sensors and configured with programmed instructions to:
(i) associate spatial coordinates corresponding to the plurality of intraoral surface locations with the multimodal image content;
(ii) generate a stitched surface contour of the patient's dentition by reconstructing and stitching from a data subset of the multimodal image content while preserving an association of the spatial coordinates of the multimodal image content to the stitched surface contour;
(iii) generate tooth outlines for one or more teeth from the stitched surface contour;
(iv) arrange the tooth outlines as a dental chart representing a spatial ordering of the one or more teeth and of supporting gum tissue adjacent to the one or more teeth;
(v) populate the dental chart by analyzing the multimodal image content and by associating results of the analyzing to positions on the dental chart according to the association of the spatial coordinates; and
(d) a display in signal communication with the control logic processor for displaying the dental chart.

* * * * *